(12) United States Patent
Murshid et al.

(10) Patent No.: US 7,174,067 B2
(45) Date of Patent: Feb. 6, 2007

(54) METHOD AND APPARATUS FOR SPATIAL DOMAIN MULTIPLEXING IN OPTICAL FIBER COMMUNICATIONS

(75) Inventors: Syed Murshid, Melborne, FL (US); Barry Grossman, Satellite Beach, FL (US); Puntada Narakorn, Palm Bay, FL (US)

(73) Assignee: Florida Institute of Technology, Melbourne, FL (US)

( * ) Notice: Subject to any disclaimer, the term of this patent is extended or adjusted under 35 U.S.C. 154(b) by 403 days.

(21) Appl. No.: 10/313,235

(22) Filed: Dec. 6, 2002

(65) Prior Publication Data

US 2003/0174942 A1 Sep. 18, 2003

Related U.S. Application Data

(60) Provisional application No. 60/337,516, filed on Dec. 6, 2001.

(51) Int. Cl.
*H04J 14/00* (2006.01)

(52) U.S. Cl. .......................... 385/31; 398/43
(58) Field of Classification Search .............. 385/24, 385/31, 55; 398/40–43
See application file for complete search history.

(56) References Cited

U.S. PATENT DOCUMENTS

| | | | |
|---|---|---|---|
| 3,719,415 A * | 3/1973 | Rawson | 359/485 |
| 4,504,111 A | 3/1985 | Hunzinger | |
| 4,750,795 A | 6/1988 | Blotekjaer | |
| 5,392,370 A | 2/1995 | Gryk | |
| 5,418,882 A * | 5/1995 | Ortiz, Jr. | 385/124 |
| 5,430,561 A * | 7/1995 | Kato et al. | 349/202 |
| 5,878,178 A * | 3/1999 | Wach | 385/55 |
| 5,897,314 A | 4/1999 | Hack et al. | |
| 6,332,050 B1 * | 12/2001 | Feldman et al. | 385/24 |
| 6,487,349 B2 * | 11/2002 | Wach et al. | 385/115 |
| 6,584,260 B2 * | 6/2003 | Arie et al. | 385/122 |

* cited by examiner

*Primary Examiner*—Michael G. Lee
*Assistant Examiner*—Jamara A. Franklin
(74) *Attorney, Agent, or Firm*—Saliwanchik, Lloyd & Saliwanchik

(57) ABSTRACT

The subject invention pertains to a method and apparatus for multiplexing in optical fiber communications. The subject invention relates to a method and apparatus for spatial domain modulation in optical wavelengths. In a specific embodiment, the subject invention relates to a spatial domain multiplexer (SDM) for use with an optical fiber. Preferably, the input channels coupled into the fiber optic cable include collimated laser beams. The techniques of the subject invention can be utilized with single mode and multi mode waveguide structures, for example, single mode and multi mode optical fibers. The subject invention is applicable to step index optical fiber and to graded index optical fiber. Applications of the subject technology can include secure data links, for example, which can modulate data such that if the data is intercepted, the data cannot be interpreted. The subject methods and apparatus can also be used in conjunction with other multiplexing techniques such as time-domain multiplexing.

16 Claims, 24 Drawing Sheets

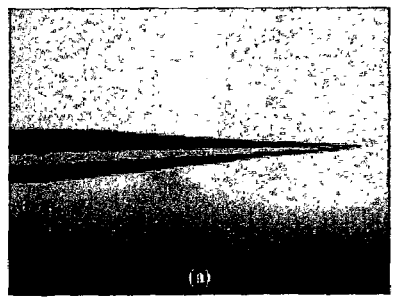 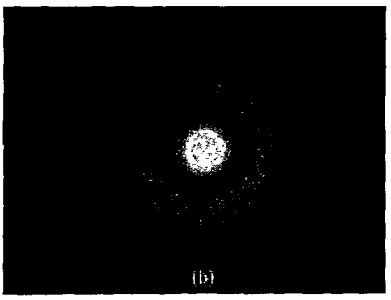 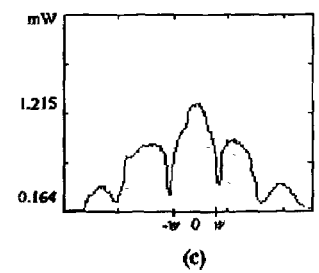
FIG. 18A  FIG. 18B  FIG. 18C
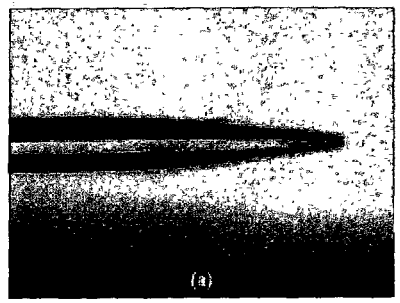 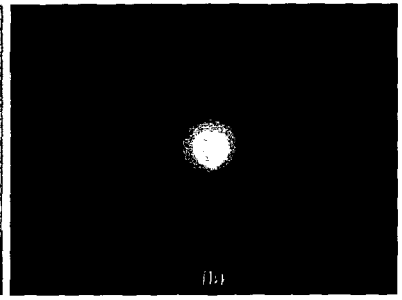 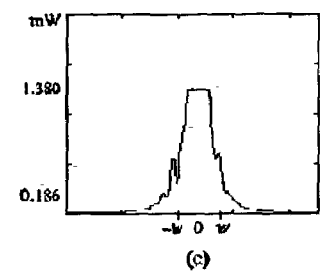
FIG. 19A  FIG. 19B  FIG. 19C
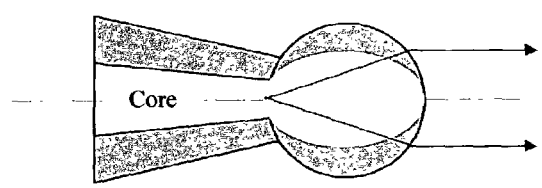
FIG. 20
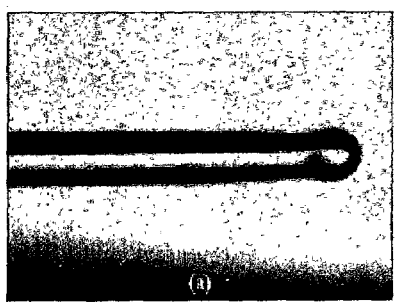 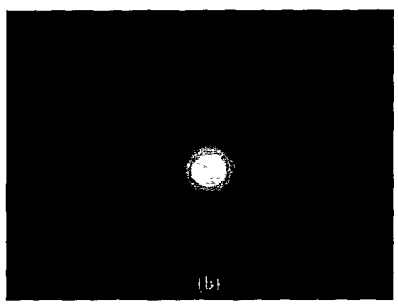 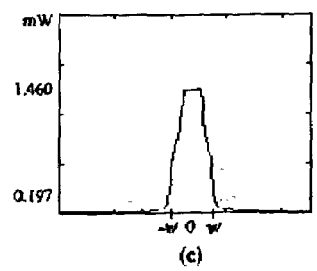
FIG. 21A  FIG. 21B  FIG. 21C

| Wavelength, μm | Photopic | Scotopic | Wavelength, μm | Photopic | Scotopic |
|---|---|---|---|---|---|
| 0.39 | 0.0001 | 0.0022 | 0.59 | 0.7570 | 0.0655 |
| 0.40 | 0.0004 | 0.0093 | 0.60 | 0.6310 | 0.0332 |
| 0.41 | 0.0012 | 0.0348 | 0.61 | 0.5030 | 0.0159 |
| 0.42 | 0.0040 | 0.0966 | 0.62 | 0.3810 | 0.0074 |
| 0.43 | 0.0116 | 0.1998 | 0.63 | 0.2650 | 0.0033 |
| 0.44 | 0.0230 | 0.3281 | 0.64 | 0.1750 | 0.0015 |
| 0.45 | 0.0380 | 0.4550 | 0.65 | 0.1070 | 0.0007 |
| 0.46 | 0.0600 | 0.5672 | 0.66 | 0.0610 | 0.0003 |
| 0.47 | 0.0910 | 0.6756 | 0.67 | 0.0320 | 0.0001 |
| 0.48 | 0.1390 | 0.7930 | 0.68 | 0.0170 | 0.0001 |
| 0.49 | 0.2080 | 0.9043 | 0.69 | 0.0082 | 0.0000 |
| 0.50 | 0.3230 | 0.9817 | 0.70 | 0.0041 | |
| 0.51 | 0.5030 | 0.9966 | 0.71 | 0.0021 | |
| 0.52 | 0.7100 | 0.9352 | 0.72 | 0.0010 | |
| 0.53 | 0.8620 | 0.8110 | 0.73 | 0.0005 | |
| 0.54 | 0.9540 | 0.6497 | 0.74 | 0.0003 | |
| 0.55 | 0.9950 | 0.4808 | 0.75 | 0.0001 | |
| 0.56 | 0.9950 | 0.3288 | 0.76 | 0.0001 | |
| 0.57 | 0.9520 | 0.2076 | 0.77 | 0.0000 | |
| 0.58 | 0.8700 | 0.1212 | | | |

METHOD AND APPARATUS FOR SPATIAL DOMAIN MULTIPLEXING IN OPTICAL FIBER COMMUNICATIONS

CROSS-REFERENCE TO RELATED APPLICATION

This application claims the benefit of provisional patent application Ser. No. 60/337,516, filed Dec. 6, 2001, which is hereby incorporated by reference in its entirety.

BACKGROUND OF INVENTION

The present invention relates to a method and apparatus for multiplexing in optical fiber communication. In a specific embodiment, the subject invention pertains to a multiplexer which couples multiple channels into an optical fiber, permits those channels to propagate a certain distance through the fiber, and finally processes the output of the fiber so to recover the individual input channels.

Typical multiplexing in optical fiber communication includes, for example, frequency-division multiplexing (FDM) and time-division multiplexing (TDM). Frequency-division multiplexing (FDM) uses frequency as the multiplexing domain. In FDM, signals generated by each sending device amplitude modulate different carrier frequencies. The modulated signals can then be combined into a single signal which can be transported by the link. After being outputted, FDM takes the combined signal, uses filters to decompose the multiplexed signal into its constituent component signals. Each component signal can then be passed to an amplitude demodulator, which can separate the carrier signal from the message signal. The message signal is then sent to an appropriate receiver. The carrier frequencies need to be different enough to allow the modulation and demodulation of the signals.

In TDB, multiple transmissions can occupy a single link by subdividing each transmission and interweaving the subdivided portions. TDM can be implemented in two ways: synchronous TDM and asynchronous TDM.

The subject invention relates to a method and apparatus for spatial domain multiplexing in optical fiber communications.

BRIEF SUMMARY

The subject invention pertains to a method and apparatus for multiplexing in optical fiber communications. In a specific embodiment, the subject invention relates to a spatial domain multiplexer (SDM) for use in optical fiber communications. The technique of the subject invention may be used with various waveguides structures.

In a specific embodiment, the subject SDM can have a beam combiner module (BCM), a length of fiber optic cable, and a beam separator module (BSM), and a channel recovery section.

BRIEF DESCRIPTION OF THE DRAWINGS

FIG. 18A shows a photograph of an optical fiber having a needle-shaped tip.

FIG. 18B shows the radiation pattern from the optical fiber shown in FIG. 18A.

FIG. 18C shows the magnitude of the field intensity of the output of the optical fiber shown in FIG. 18A.

FIG. 19A shows a photograph of an optical fiber having a pencil-shaped tip.

FIG. 19B shows the radiation pattern from the optical fiber shown in FIG. 19A.

FIG. 19C shows the magnitude of the field intensity of the output of the optical fiber shown in FIG. 19A.

FIG. 20 shows a longitudinal cross-section of an optical fiber having a spherical-shaped tip.

FIG. 21A shows a photograph of an optical fiber having a spherical-shaped tip.

FIG. 21B shows the radiation pattern from the optical fiber shown in FIG. 21A.

FIG. 21C shows the magnitude of the field intensity of the output of the optical fiber shown in FIG. 19A.

DETAILED DISCLOSURE OF THE INVENTION

The subject invention pertains to a method and apparatus for multiplexing in optical fiber communications. The subject invention relates to a method and apparatus for spatial domain modulation in optical wavelengths. In a specific embodiment, the subject invention relates to a spatial domain multiplexer (SDM) for use with an optical fiber. Preferably, the input channels coupled into the fiber optic cable include collimated laser beams. The techniques of the subject invention can be utilized with single mode and multi mode waveguide structures, for example, single mode and multi mode optical fibers. The subject invention is applicable to step index optical fiber and to graded index optical fiber. Applications of the subject technology can include secure data links, for example, which can modulate data such that if the data is intercepted, the data cannot be interpreted. The subject methods and apparatus can also be used in conjunction with other multiplexing techniques such as time-domain multiplexing.

The subject invention can involve launching multiple light beams, each corresponding signal, into an optical fiber and separating the output of the optical fiber back into the individual communication signal. Such multi-beam excitation of an optical fiber can be accomplished by launching one or more angular beams, each at a different angle and/or input position. In this way, each light beam is able to propagate independently according to its own trajectory inside the fiber. Because most rays from angular beams belong to the class of skew rays, we can refer to these angular rays as skew beams. Rays which travel so as to intersect the fiber axis can be referred to as meridional rays.

The subject invention also relates to a method and apparatus for scanning the output beam of the subject device. The output beam can be scanned back and forth and/or up and down via a variety of means, including, but not limited to, mechanical, electro-optical, or optical apparatus. The scanned beam can be utilized in a variety of applications, including, but not limited to plasma TV.

Figures 1, 2:
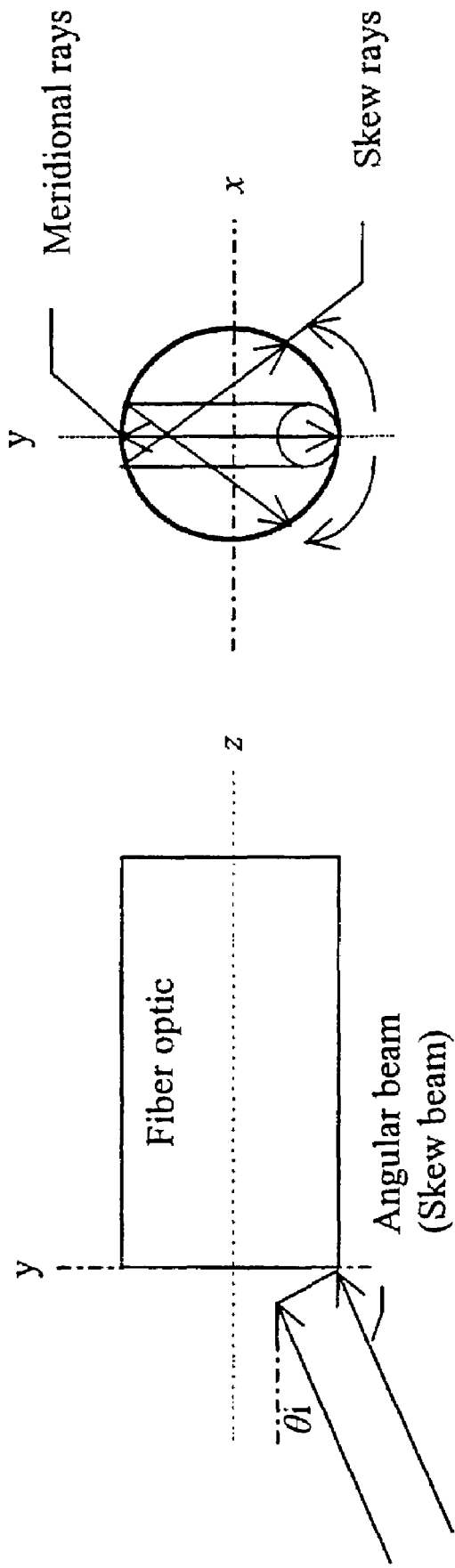
FIG. 1 is a longitudinal sectional view of an incident beam on a fiber optic cable which can be used with a SDM in accordance with the present invention.
FIG. 2 is a cross-sectional view of an incident beam and its ray components which can be incident on a SDM in accordance with the present invention.

To describe the subject invention, some general concepts will be discussed. A light beam can be used to describe a symmetrical circular beam, such as a collimated laser beam. FIG. 1 illustrates a sketch of an angular beam in the yz-plane. Typically, when angular beams are launched into the fiber optic, only a small portion of the rays are meridional rays, with most of the rays being skewed rays. FIG. 2 illustrates a cross-section of an optical fiber showing a meridional ray and a couple of skewed rays. As discussed, the propagation of meridional rays intersect the fiber axis. Skew rays, on the other hand, are those rays that are not in a plane with the fiber axis. The reflection at the core-cladding interface can cause skew rays to travel in spiral traces around the fiber axis. For an effective launching angle, skew rays should be launched such that total internal reflection is achieved at the core cladding interface. Skew rays can transport light energy over some distance. Therefore, excitation of light beams at various angles can enable the fiber optic system to carry a plurality of channels.

In a specific embodiment an optical fiber can be excited by two or more optical sources. By varying input angles and/or launch positions, more skew beams can be launched into a fiber. Ray theory can be used to analyze a beam path. A transformation of light beam can be made in the spatial domain from an angular input to a circular ring output. At the output of the fiber, each input beam can be recovered and separated. Such separation can be based on the location of rings concentric with the fiber axis.

Figure 3:
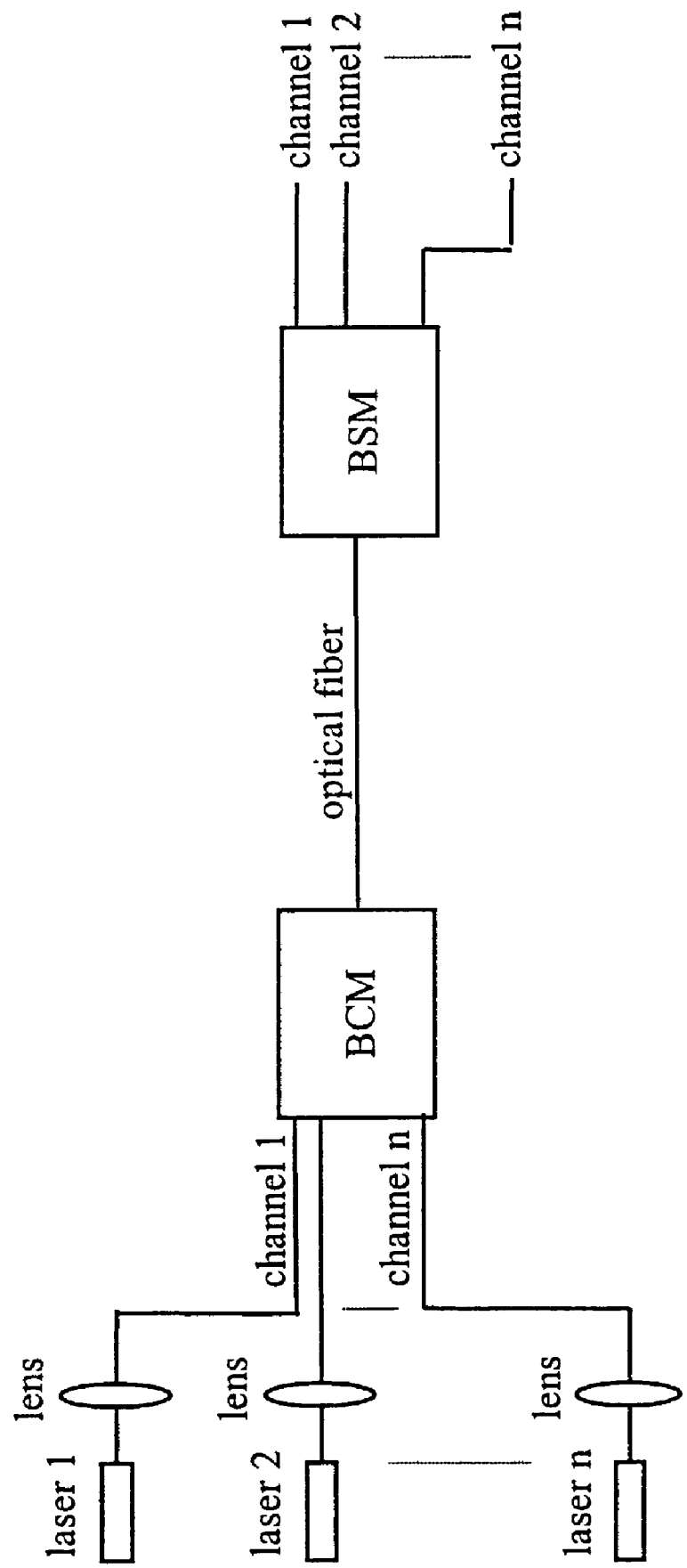
FIG. 3 illustrates a plurality of lasers incident on a SDM and a corresponding plurality of output from a BSM, in accordance with the present invention

In a specific embodiment, the fiber optic hardware to simulate part of communication system can include two or more transmitters, a beam combiner module (BCM), a sample of optical fiber, and a beam separator module (BSM). FIG. 3 shows a basic hardware configuration in accordance with a specific embodiment of the subject invention.

The propagation of light in an optical fiber can be viewed from two different perspectives due to a dual nature of light. First, light can be viewed as a discrete particle. Second, light can be viewed as an electromagnetic wave. These two views of light behavior allow us to analyze light propagation in an optical fiber in two different ways, corresponding to ray theory and wave theory, respectively. Ray theory can provide a good basis for analysis. Two or more light beams, laser beams, for example can be launched into a beam combiner module. A basic ray diagram can be used to analyze rays entering the fiber. By using skew beams, more light sources can be launched into the fiber optic at different angles and/or positions.

In a specific embodiment, a circular core multimode fiber having a uniform core refractive index can be used. Skew rays can travel in a spiral form due to the reflection at the core-cladding interface. A circular helix can be used to predict the propagation phenomena of skew rays. Leaky rays or other types of rays that do not yield a satisfying result will not be included.

A circular cone can be used as a model for the helical rays exiting the fiber at the beam separator. A conic section with a plane perpendicular to the fiber axis can be used to observe a ring pattern. Multi-ring patterns can provide information of channel separation for individual laser sources.

We will use typical x, y, and z coordinate systems to describe the basic plane figures. Then, the plane geometric figures are investigated by introducing appropriate equations to support the design methods and experimental results.

Figure 4:
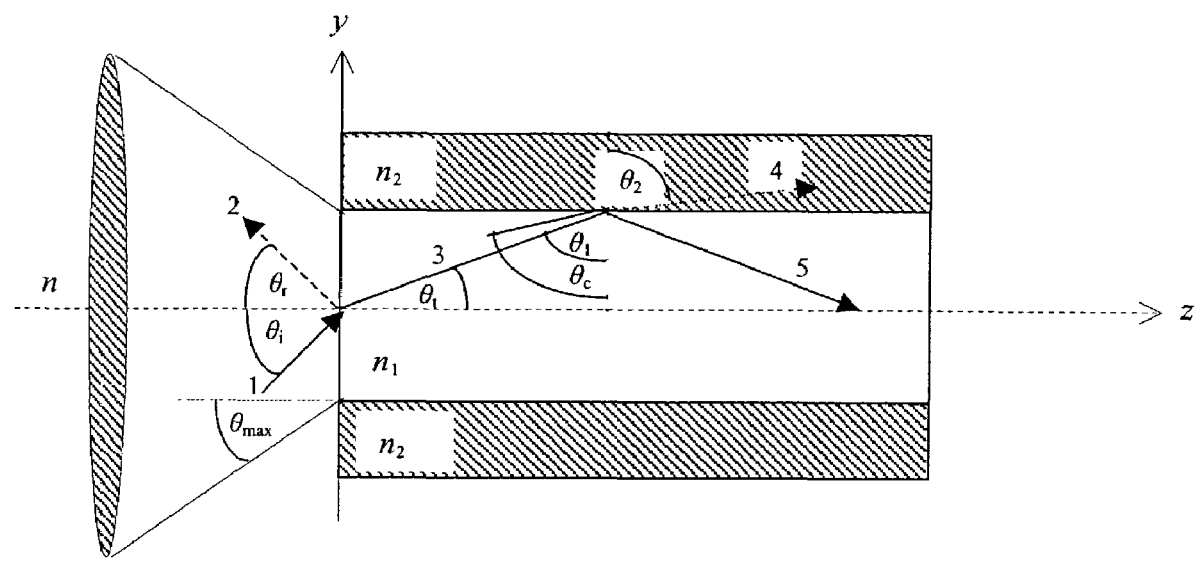
FIG. 4 is a ray diagram for meridional rays in a two-dimensional coordinate system.

Here, a conventional ray diagram is reviewed. Since most fibers are solid cylinders, planar waveguide is used to determine the light confinement by total internal reflection of propagating ray path inside the fiber. FIG. 4 illustrates a ray diagram for meridional rays in a two-dimensional coordinate system. Graded index optical fibers can also be utilized with the subject invention. Referring to FIG. 4, the refractive indices of air, fiber core and cladding are represented by $n_0$, $n_1$, and $n_2$, respectively, for a step-index fiber. The ray is traveling from left to right in the z-direction.

The incoming ray 1 strikes the air-core boundary at an angle $\theta_i$ to the fiber axis. Ray 1 is partially reflected from the air-core boundary (ray 2) and partially transmitted into the core region (ray 3). The transmitted ray 3 is refracted at an angle $\theta_t$ to the normal line of the core surface (i.e., the fiber axis). Ray 3 continues to propagate at an angle $\theta_t$ until it strikes the core-cladding interface. Ray 3 is partially reflected from the core-cladding interface (ray 5) and partially transmitted into the cladding region (ray 4). Ray 4 escapes into the cladding at an angle $\theta_2$ to the normal line of the core-cladding interface, while ray 5 reflects back into the core. Eventually, ray 4 will be lost which is an unwanted condition. For total internal reflection to occur, an incidence angle $\theta_1$ which ray 3 makes to the normal of the core-cladding interface must be greater than $\theta_c$ or a critical angle. Conceptually, this is a preferred condition for skew ray excitation. Therefore, a method of launching multi-beam can be achieved.

Two important laws related to the ray theory are the law of reflection and the law of refraction. In the case of reflection, it is stated that the angle of incidence equals the angle of reflection. We can write $$\theta_{incidence} = \theta_{reflection} \quad (1)$$

In the case of refraction, the equations are expressed by applying Snell's law. Refer to the ray diagram, we have $$n_0 \sin \theta_i = n_1 \sin \theta_t \quad (2)$$

$$n_1 \sin \theta_1 = n_2 \sin \theta_2 \quad (3)$$

$$\theta_t = \frac{\pi}{2} - \theta_1 \quad (4)$$

where
$\theta_i$=angle of incidence in air
$\theta_t$=angle of transmitted ray in the core region
$\theta_1$=angle of incidence in the core region
$\theta_2$=angle of transmitted ray in the cladding region From equation (3), the sine of the critical angle is determined by setting $\theta_2$ equal to $\pi/2$ and $\theta_1$ equal to $\theta_c$ which yield, $$\sin \theta_c = \frac{n_2}{n_1} \quad (5)$$

From the above relationship, the maximum angle of incidence which results in total internal reflection within the fiber is obtained by $$\sin \theta_{max} = (n_1^2 - n_2^2)^{1/2} \quad (6)$$

By definition, equation (6) is defined as the numerical aperture (NA). The numerical aperture defines an acceptance cone for which all bounded rays are contained.

From this geometry, we see not only meridional rays which intersect the fiber axis, but different rays will be accepted into a circular fiber if they are within the fiber's numerical aperture. Since the light is accepted at various ray angles, the different rays will have different path lengths down the fiber. For our specific interest, we will investigate a technique to launch the laser beam in a manner similar to skew rays that travel off the center axis of the fiber in a helical form. Although skew rays are considered as an unfavorable launch condition, nevertheless, it remains useful. The central rays that enter the fiber along its axis remain as a preferred position. Next, we will look into the propagation of ray in a helical form as a result of skew ray injection.

Because rays travel in a straight line, it seems impossible to visualize that rays can move in a circular fashion. Here, it might takes several ways for explanation. One way to show this point of view is that the helical rays can be observed by pointing a laser beam into a circular glass tube. In a three dimensional perspective of a circular fiber, the reflection of a skew ray occurs at a curved interface rather than a flat boundary. Although various types of helical forms exist, due to bounded rays, it is convenient to imagine that the propagation of a skew ray can be approximated by a space curve circular helix in either clockwise or counter clockwise rotation. The rotational scheme is relating to the direction of skew ray that is first positioned into the fiber.

Figure 5:
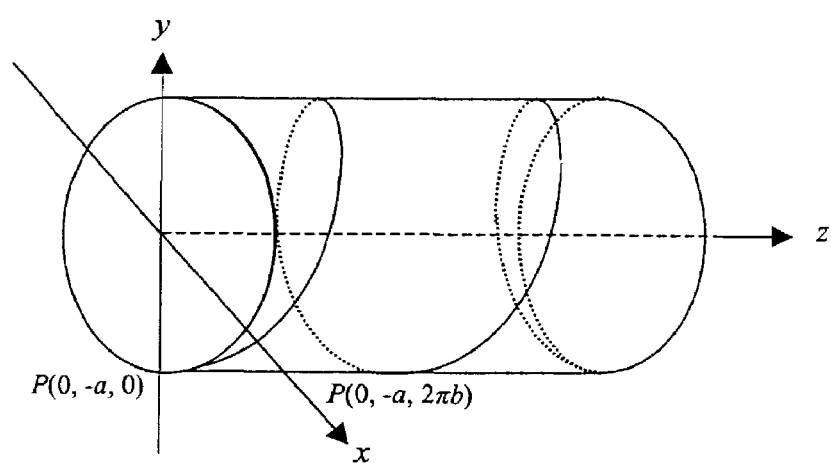
FIG. 5 is a perspective view of a an ideal circular helix path.

Although skew rays are in a class of leaky rays, light energy can be transported by this fashion over some distance. In fiber optics, this particular ray path can be valuable for certain applications. FIG. 5 illustrates a section of helical ray.

The circular helix path is represented by the twisted curve of an equation $$H = \{(a \cos t, a \sin t, bt) : t \in R\} \quad (7)$$

where a and b are positive. The parametric equations for H are $$x(t) = a \cos t \quad (8.a)$$

$$y(t) = a \sin t \quad (8.b)$$

$$z(t) = bt \quad (8.c)$$

If the point P(x, y, z) is on H, then P is on the circular cylinder having equation $x^2 + y^2 = a^2$. As t varies from 0 to $2\pi$, the point P starts at (0, −a, 0) and winds around this cylinder one time. Other intervals of length $2\pi$ lead to similar loops.

If the curve H is continuous on an interval along the path, the length L of H from point P(0) to P($2\pi$) can be determined by $$\begin{aligned} L &= \int_0^{2\pi} \sqrt{\left(\frac{dx}{dt}\right)^2 + \left(\frac{dy}{dt}\right)^2 + \left(\frac{dz}{dt}\right)^2} \, dt \\ &= \int_0^{2\pi} \sqrt{a^2 \sin^2 t + a^2 \cos^2 t + b^2} \, dt \\ &= \sqrt{a^2 + b^2} \, 2\pi \end{aligned} \quad (9)$$

As the helical ray exiting the fiber, due to unbounded condition, a cone angle of ray is produced. Once again, rays are leaving from the fiber into free space. For an ideal condition, output rays should exit at cone angles equal to input beam angles. In conic section, when intersecting the circular cone by a flat surface perpendicular to the axis, a circle is obtained. This result can also be observed through an experiment, such that, when intersecting the circular cone of light by a plane perpendicular to its axis, a circular ring appears. As a result, we can estimate the size and dimension of the output rings based on the equation of a cone as $$\frac{x^2}{a^2} + \frac{y^2}{b^2} - \frac{z^2}{c^2} = 0 \qquad (10)$$

where a, b, and c are positive real number. The plot of this equation has the axis along the z-direction. In our case, z is a fiber axis and always positive. From equation (10), the trace in the yz-plane has equation $y^2/b^2 - z^2/c^2 = 0$. Solving for y we obtain $$y = \pm(b/c)z, \qquad (11)$$

which gives us the equations of two straight lines through the origin. Similarly, the trace in the xz-plane is a pair of straight lines that intersect at the origin, represented by $$x = \pm(a/c)z \qquad (12)$$

Figure 6:
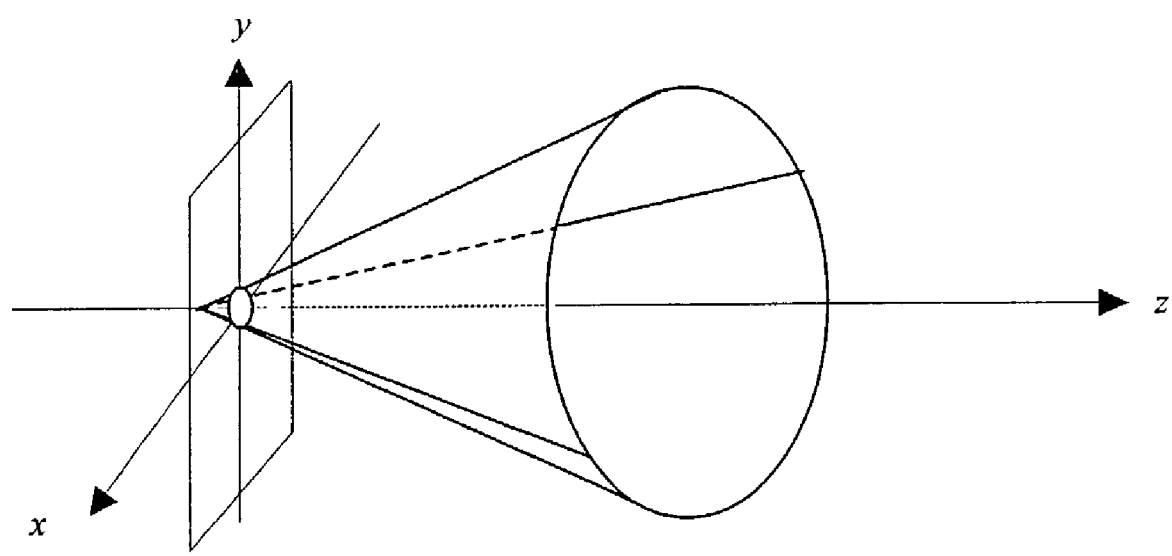
FIG. 6 is a perspective view of an emerging group of rays from a SDM in accordance with the present invention forming an ideal conical path.
Figure 7A:
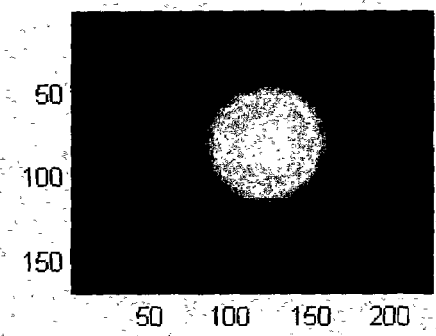
FIGS. 7A–7D are intensity distributions of laser light exiting an optical fiber with a 8 μm core and a 125 μm cladding.
Figure 7B:
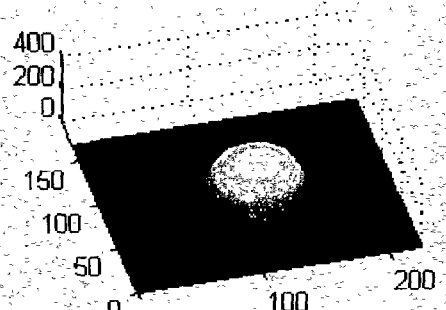
Figure 7C:
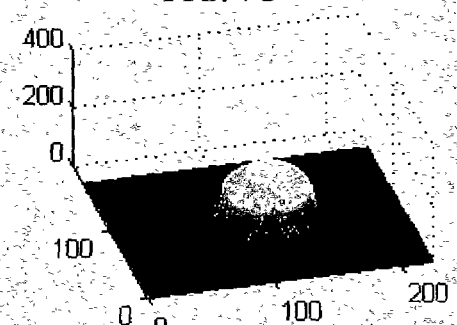
Figure 7D:
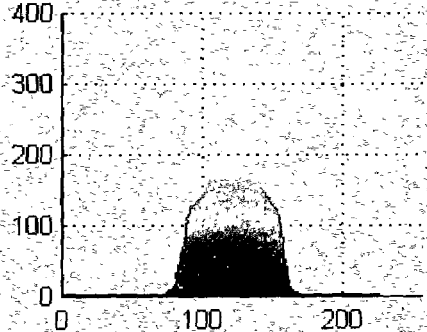

For traces on the xy-plane, a circle is obtained when a=b. If a≠b, an ellipse is obtained. The graph is sketched in FIG. 6.

Following are examples which illustrate procedures for practicing the invention. These examples should not be construed as limiting. All percentages are by weight and all solvent mixture proportions are by volume unless otherwise noted.

EXAMPLE 1

Figure 8:
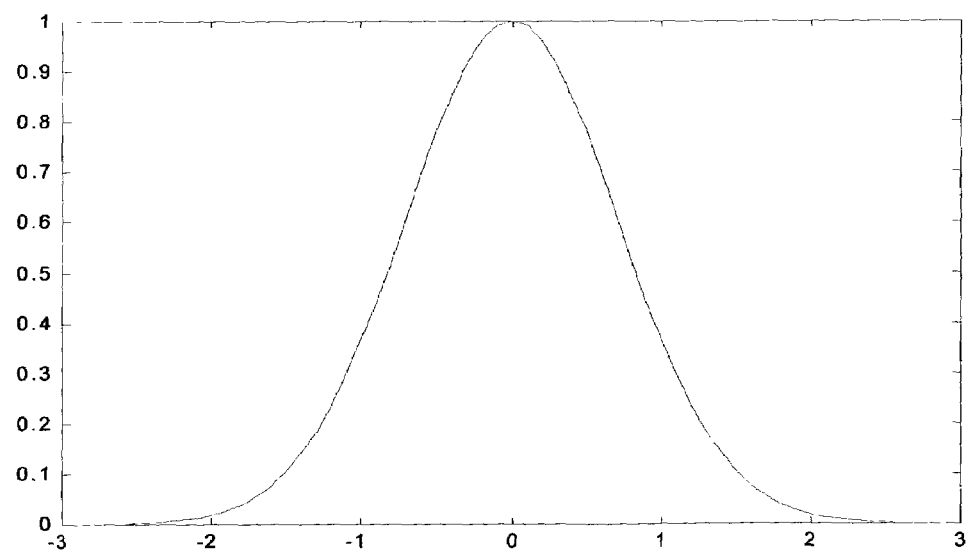
FIG. 8 illustrates a gaussian intensity distribution.

The optical source used is a Helium-Neon laser having a short wavelength of 633 nm. The laser beam is focused into an optical fiber with 8-μm core diameter and 125-μm cladding. The beam is adjusted for maximum intensity. Then, it is photographed and processed in 3-dimensional plot as shown in FIG. 7. Observe that the intensities vary uniformly across the transverse plane. It is a symmetrical bell-shape that can be approximated by the Gaussian intensity distribution, FIG. 8, given by $$I = I_0 e^{-2r^2/w^2} \qquad (13)$$

When r=0, the exponential term $e^0 = 1$, thus we obtain $I = I_0$ which is the maximum intensity at the center of the beam. The term w is the spot size of the bell-shape. It is defined by the radius of the spot at which the beam intensity has dropped to $1/e^2 = 0.135$ times its peak value $I_0$.

A Beam Combiner Module (BCM) is designed to incorporate or combine multiple light beams input to a single optical fiber. In a specific embodiment, multiple lasers are launched into the test fiber with the lowest order beam path along an axial direction and the higher order beam path at specific angular position to the fiber axis. Although the laser beams are combined at the fiber entrance and result in what might be a disadvantage scheme, the beams are propagating in different paths. That is, each beam will travel independently inside the fiber according to it's own trajectory. This situation leads to the benefit for spatial domain excitation such that multiple beams of the same or different wavelengths can be launched simultaneously into the fiber. If the two beams are in the same path, they will be mixed or combined. Therefore, we need to avoid this condition unless it is mixed purposely. If the beams are in different path, they can subsequently be separated into individual channels.

The round fiber geometry allows many forms of light confinement internally. We will use this fiber geometry with uniform refractive index of the central core for our experiment. It is normally referred to as a step index fiber. Today, most waveguides are highly flexible fiber composed of nearly transparent dielectric materials either fabricated from plastic or high-purity glass. Also, losses are very low. Because of these properties, multiple laser paths can be traced independently as discussed by the propagation of helical rays. Since the helical rays taking a longer path, a higher power laser may be required to support longer distance. By using equation (9), the length of helical path can be determined and the laser power can be adjusted accordingly. Because of some limitations, such as proper equipment and alignment tools, the plastic fiber is used in our experiment. Its advantage is due to large core diameter of approximately 1.0 mm. The fiber under test is eight feet in length with NA=0.5 and $n_1 = 1.5$ for the core refractive index. In general, the fiber attenuation is 0.31 dB/m at 665 nm. It is a typical step index profile fiber.

Beam Separator Module (BSM): At this point, we will observe the resultant of output light, presumably a cone of light. The image of light are photographed and plotted by two experiments. The first experiment is performed in order to determine the relationship of the input-output angles. The second experiment is performed to illustrate the formation of output rings. These rings are observed when output rays intersected by a panel perpendicular to the fiber axis.

Figure 9:
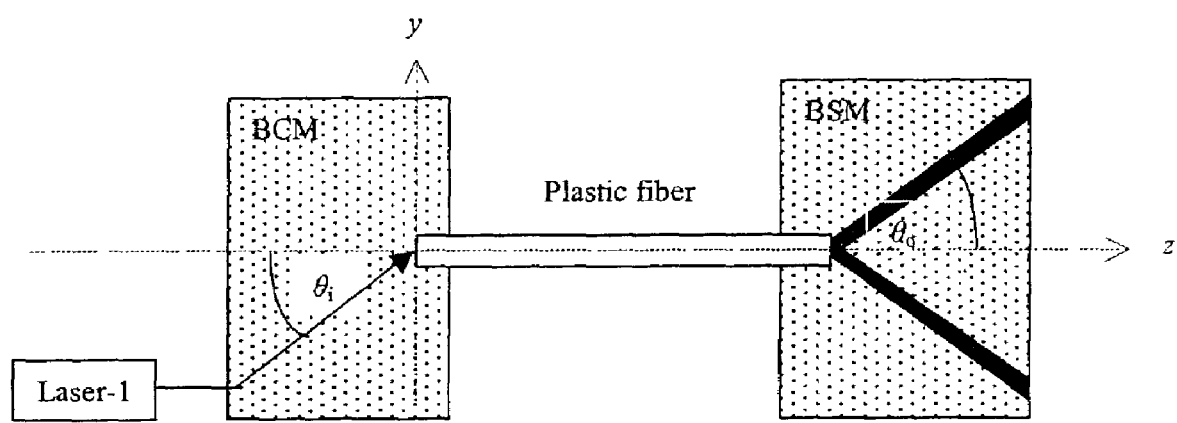
FIG. 9 illustrates a sectional view of a single laser beam launched into a plastic fiber at angle of incidence, $\theta_I$.

We begin by setting up the system as shown in FIG. 9 and only one laser source is used. The laser beam is launched into the plastic fiber at various $\theta_I$ or angle of incidence. Knowing that the NA for plastic fiber is 0.5, by calculating from equation (6), we obtain the acceptance cone angle of 30 degrees maximum. Therefore, more transmitting angles are possible. By increasing $\theta_I$ in discrete steps from 0, 10, 20, 30, 40, and 50 degrees, we can observe the variation of conic shapes of output light. The cone images are photographed by intersecting output rays with a flat panel parallel to the fiber axis. Thus, physical output angles can be determined.

Figure 10:
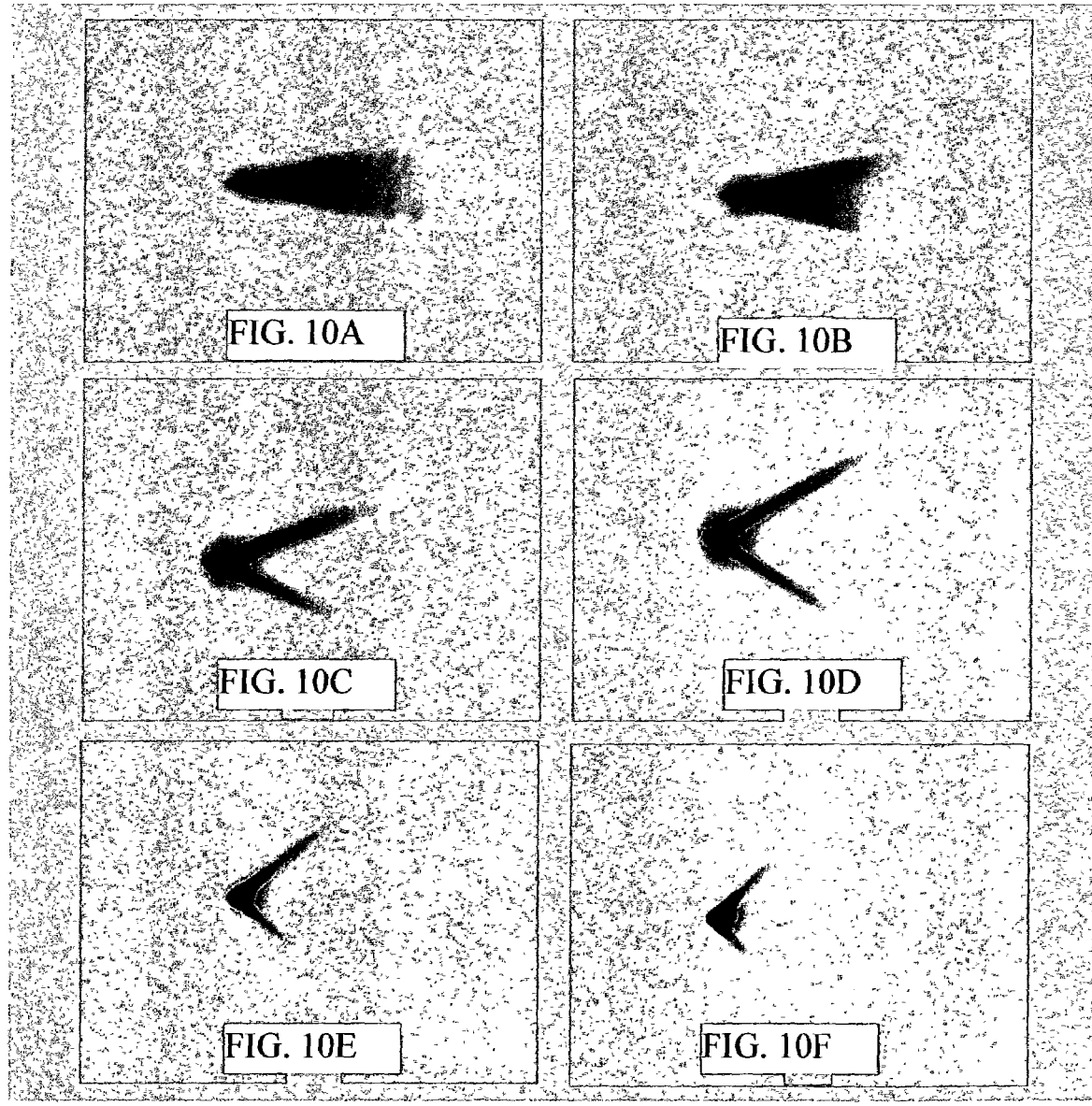
FIGS. 10A–10F are output images for different incident angles of the beam of FIG. 9 in accordance with the present invention.

FIG. 10 illustrates output images for each angular input. They are plotted in sequential orders. From these images, we can determine output angles accurately as observed on the yz-plane only. As a result, we obtain angular input-output relations for images (a) $\theta_i = 0°$, $\theta_o = 12°$, (b) $\theta_i = 10°$, $\theta_o = 14°$, (c) $\theta_i = 20°$, $\theta_o = 20°$, (d) $\theta_i = 30°$, $\theta_o = 30°$, (e) $\theta_i = 40°$, $\theta_o = 37°$, and (f) $\theta_i = 50°$, $\theta_o = 41°$. These relationships are plotted in FIG. 11.

From observation of FIG. 10: (a) When input beam is at $\theta_i = 0°$, most output intensity is dominated around the central region of the cone. (b) When increasing $\theta_i = 10°$, the cone angles start to spread apart and also most output intensity begin to form a V-shape. (c), (d), and (e) For $\theta_I$ keeps increasing to 20, 30, 40 degrees, the cone angles spread out wider and the fine V-shape intensity is dominant. (f) Input laser is at $\theta_I = 50°$, near field is predominately visible.

Second Experiment

Figure 12:
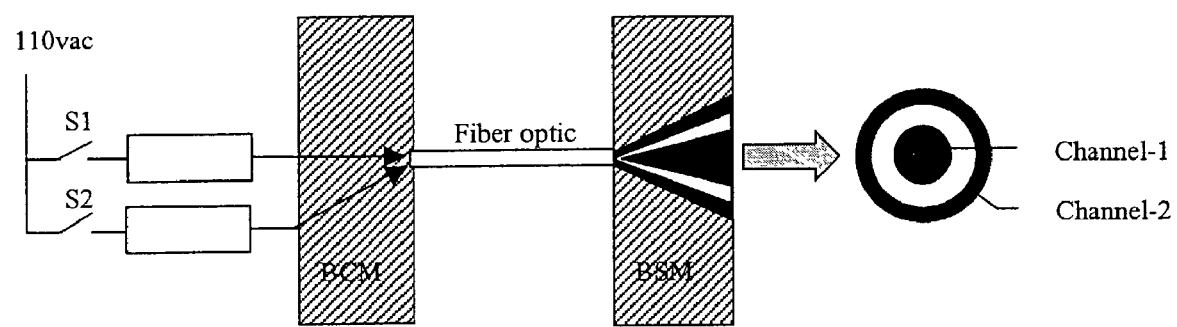
FIG. 12 is a sectional view of two laser beams incident on a SDM in accordance with the present invention at two different incident angles, and the two resulting circular rings outputted by the SDM.

By applying the above concepts, we are able to test the beam combining system as planned. For demonstration, we excite the BCM by two laser sources and then observe at the BSM, output rings should display as two separate rings. The basic block diagram is illustrated in FIG. 12.

From this block diagram, a beam of light is launched from laser-1 into the BCM at zero degree incidence angles. From laser-2, it is aimed at approximately 25 degrees. The two beams are combined at the fiber entrance. Due to differences in the path of propagation, the two beams exit from the fiber as cone shapes but differ in sizes. The inside cone belongs to laser-1 and the outside cone belongs to laser-2.

To insure that they do not interfere upon arrival, at first, we switch S1 and S2 to "ON" and observe that the two rings appear at the plane vertical to the fiber axis. A flat plane is located at about 2-inch from the fiber end. A photograph is taken as shown in FIG. 13-(*a*). The picture illustrates the true image of the laser beams exiting directly from the fiber. The energy concentration can be observed as the image is tilted in three-dimensional plot, as shown in FIG. 13(*b*). From the image, the channel separation can be observed and determined very accurately. FIGS. 13-(*c*) and (*d*) are the images of output laser-1 only, i.e., when switch S2 is turned "OFF" to disable laser-2. Finally, switch S2 is turned "ON" and S1 is switched "OFF" to ensure that only laser-2 is excited. The ring of laser-2 is displayed in FIGS. 13-(*e*) and (*f*).

From this experiment, we observed the fundamental conditions of the ray path as follows:

All rays start from a point A and arrive at another point B and propagate independently of the path taken.

For the ray to be totally guided, it must satisfy the total internal reflection by the expression of Snell's Law.

In the case of reflection, the angle of incidence equals the angle of reflection. It implies that losses occur at boundary between two dielectrics unless the fiber end is implicated by an antireflection coating.

Light beams propagating along the axis of the fiber is a preferred condition.

Skew rays, although not properly guided by the fiber, may propagate a considerable distance.

The ability of an optical fiber to capture light from a wide acceptance angle is determined by the numerical aperture.

Preferably, any number of lasers which can be incident on BCM with an incident angle $\theta_i \leq \theta_{max}$ such that each produces a distinct ring pattern on the perpendicular plane to the fiber axis. A variety of methods can be used to recover the individual laser beam outputs from their individual ring patterns. For example, an array of photodetectors could be radially placed such that each photodetector detects a single ring distribution. If desired, the photodetector could signal an independent laser which would generate a beam having the same optical properties as the incident beam which produced the individual ring distribution.

From our experiment, a micro-sphere is made as an integral part at the pencil end of the step index fiber. This technique provides the visibility of a spherical shape that is used to focus or reduce the divergence of light. As a result, a collimated light beam is obtained upon exiting the fiber. The maximum power is obtained approximately 1.460 mW. FIGS. 21A–C illustrates the resultant of the far field radiation from the spherical end. Although the mathematical model is not available, the experimental result is in line with our expectation such that the output beam is collimated with uniform field intensity of a Gaussian shape.

EXAMPLE 2

Although there are many different types of optical fibers and light sources available, two basic components were used in this example.

The Helium-Neon laser wavelength 633 nm

The 8/125/250 µm step-index profile optical fiber

Figure 14:
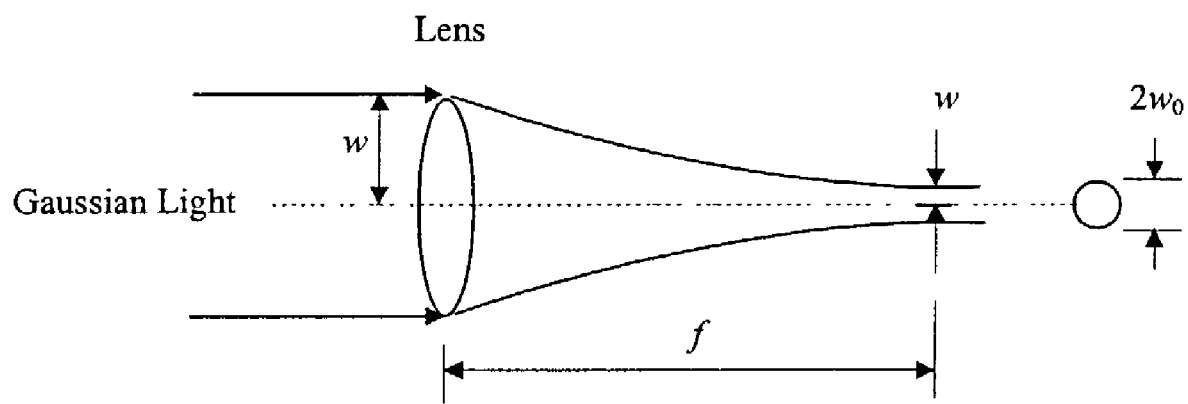
FIG. 14 illustrates the focusing of a gaussian light beam down to a spot.

A Gaussian pulse has the unique feature that it is invariant under the Fourier transform. The time domain representation and the frequency domain representation have the same appearance. When focusing the Gaussian light with a lens, theoretically, it should yield a distribution of light in the focal plane that is also Gaussian shape. When viewed by the eye, this pattern appears to be a circle of light. This condition is illustrated in FIG. 14.

The spot size in the focal plane can be determined by $$w_0 = \frac{\lambda f}{\pi w} \quad (14)$$

where w is the lens radius, $\lambda$ is the wavelength and f is the focal length. Because of this simplification, in many cases, the field intensity of light source is normally approximated by the Gaussian function. When we use the laser source, the uniform laser light can be very closely related to the Gaussian function. In many instances, we call it a Gaussian beam. If the uniform laser light is focused, by careful experiment, the beam will reduce to a small spot of light surrounded by rings of steadily diminishing intensity. The diameter of the central spot can be approximated by $$d = \frac{2.44 \lambda f}{D} \quad (15)$$

Where $\lambda$ is the wavelength, f is a focal length and D is the lens diameter. Normally, the ratio f/D is called the f-number of the lens. If we replace $w_0 = d/2$ and $w = D/2$ into equation 14, it yields $d = 4\lambda f/\pi D = 1.27 \lambda f/D$ which is comparable to equation 15. Thus, the size of the focused Gaussian spot is not much different from the size of the focused spot by uniform laser beam.

At the fiber entrance, the uniform laser beam can be pre-launched into the central core region. The beam is preferably focused properly to prevent light from leaking into the cladding. For practical condition of input-output phenomena, the incident angle of a ray should exit from the fiber at the same angle $\theta$.

Figure 15:
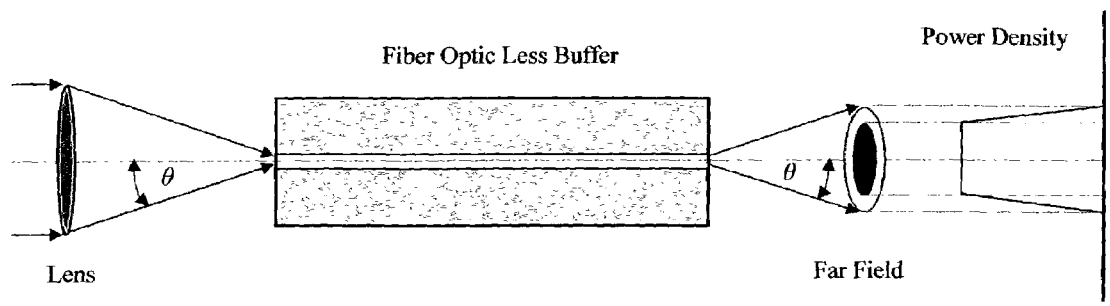
FIG. 15 illustrates schematically an input and output mechanism in accordance with the subject invention, showing a far field output from a step index optical fiber.

If the laser beam is focused and launched within the numerical aperture, a conic-shape of light is expected at the fiber output. The far field condition from the step index profile fiber is predicted and illustrated in FIG. 15. The diminishing field intensity would appear as the ring of light. In this case, if the beam is not properly focused, the group of rays will spread out so rapidly when they are leaving the fiber. The resultant of the far field laser spot will not be uniform.

Once the laser is launched, the uniform laser beam (or Gaussian beam) will have a finite beam width when exiting the fiber end in the form of a light cone with fixed numerical aperture. Thus, the electric field and the power density follow the Gaussian distribution function. The end face of the fiber is preferably smooth and cut perpendicular to the axis of laser beam in order to achieve the maximum power transmission.

Typically, fiber optic cables have a circular cross-section. Because of this basic geometry, the physical dimension can be reshaped into a section of micro-component anywhere along its length. We can reshape the bare fiber directly at the end section by using the electric arc. Four examples of shapes which can be implemented include:
- Flat end
- Needle tip
- Pencil end
- Spherical end The flat end is a perpendicular cut that is normally required in most fiber optic system. From this basic geometry, the power density or the amount of laser power per unit area can be determined by $$J = P/A \qquad (16)$$

The variable P is the power that a fiber is transmitting and A is the area of the fiber tip that cannot be zero. For this example, if P=1.450 mW and A=50.27×10$^{-12}$ m$^2$, we have $$J = 28.85 \times 10^6 \text{ W/m}^2$$

Figures 16A, 16B, 16C:
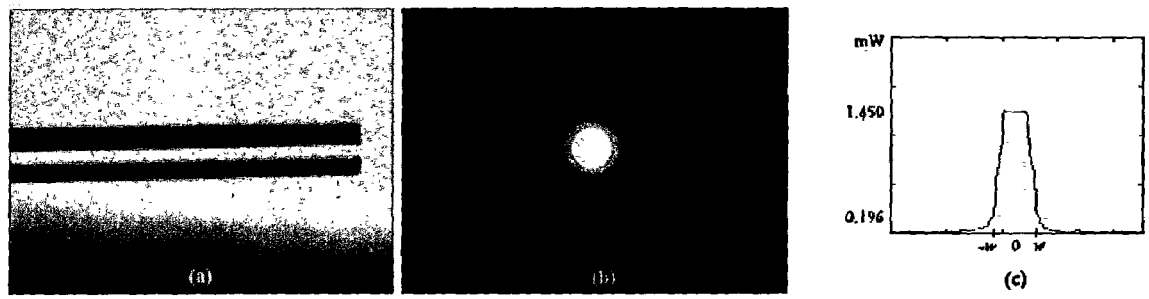
FIG. 16A shows a flat end of an optical fiber.
FIG. 16B shows the output from the optical fiber shown in FIG. 16A.
FIG. 16C shows the power distribution of the output shown in FIG. 15B.

FIGS. 16A–C illustrate the actual far filed intensity of this laser beam. The field intensity can be predicted by using FIG. 15. The central bright area has the highest concentration of the laser power that is surrounded by the fast decaying region. This region has much lower energy level and appears as a reddish ring of light. The magnitude of the field intensity is plotted in FIG. 16C where the maximum power is measured to be 1.450 mW. By comparing FIG. 15 and FIGS. 16A–C, the result is in line with our expectation.

Figures 17A, 17B:
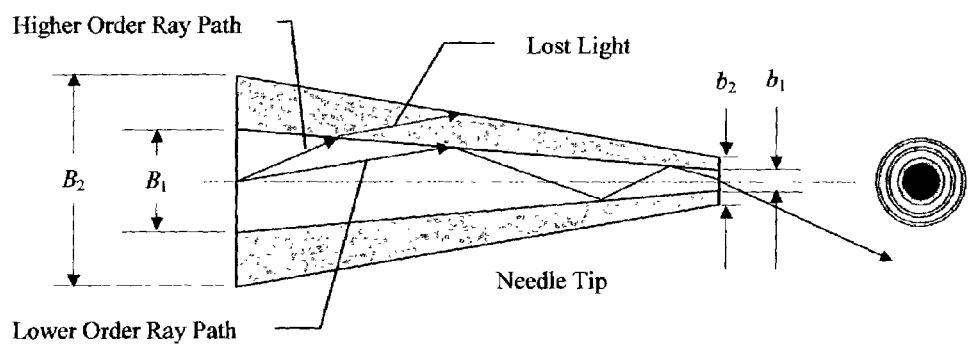
FIG. 17A shows a longitudinal cross-section of an optical fiber having a needle-shaped tip.
FIG. 17B shows the output from the optical fiber shown in FIG. 17A.

By using the electric arc technique, the core and cladding regions can be reshaped to form a needle. When the needle is drawn, the radius of both the core and cladding are expected to reduce uniformly at the same rate. The cross-sectional area of the needle can be very small but never be zero. FIG. 17 illustrates the physical dimension of the needle tip. Because of the needle shape, the degree of reflection will change accordingly. If the propagation of light travels from the larger to smaller cross-sectional areas, the angle of light that intersects with the needle-cone axis will increase. The higher order ray path can escape into the cladding and be lost. The lower order ray path is expected to remain inside the fiber until it leaves the end of the needle. When many rays are lost, the amount of laser power will be reduced. What remains of the laser beam can exit the fiber in the form of special patterns. Because of the uniform laser light, as discussed earlier, the lowest order ray path is expected to remain at the central region surrounded by many rings of higher order ray paths. This is illustrated in FIGS. 17A–B.

When the end tip of an optical fiber is reshaped, the power density is also changed. From the equation 16 above, the power density increases higher as the area gets smaller around the needle tip. From FIGS. 17A–B, we can find the diameter of the needle by equating $$\frac{b_1}{b_2} = \frac{B_1}{B_2} \qquad (17)$$

The large area that is represented by $B_1$ and $B_2$ are the core and cladding diameters of the fiber. The smaller area that is represented by $b_1$ and $b_2$ are the core and cladding diameters of the needle. For this example, if we use the 8/125 µm step index fiber and $b_2$ is measured to be 20 µm, then the core diameter of the needle is $b_1$=1.280 µm. At the needle tip, if the output power is 1.215 mW, then the power density can be determined as $$J = 944.20 \times 10^6 \text{ W/m}^2.$$

Note that this power density is about 30 times higher than the flat end fiber. Although an ideal needle tip cannot be achieved, as shown in FIG. 18A, the field of radiation spreads out to form a special pattern. This pattern yields a satisfying result as predicted. From the radiation pattern of FIG. 18B, the lower order ray paths appeared at the central region surrounded by the circular rings of the higher order paths. This technique shows the existence of the ring pattern as a result of uniform laser light propagating inside the fiber. The magnitude of the field intensity can be constructed by the pattern shown in FIG. 18C.

We now analyze the reverse case. Since the uniform laser beam is launched and contained within the fiber, we analyze how small we should reduce the cross-sectional area of the needle in order to obtain the lowest order mode of propagation, presumed to be HE$_{11}$ mode. For the step-index fiber, suppose we use the normalized frequency equation given by $$V = \frac{2\pi a}{\lambda} \sqrt{n_1^2 - n_2^2} \qquad (18)$$

The basic descriptions of 'a' is the fiber core radius and 'λ' is the free space wavelength. The others, $n_1$ and $n_2$, are the refractive indices of the core and cladding respectively. In this case, if only the primary mode HE$_{11}$ is allowed to leave the fiber, the normalized frequency V should be approximately 2.405 or less. By re-arranging equation 18, we have $$a = \frac{2.405\lambda}{2\pi\sqrt{n_1^2 - n_2^2}} \qquad (19)$$

Given that the fiber NA=0.2 and the laser source is 633 nm, we can determine the size of the needle core radius to be $$a = 1.211 \text{ µm} \qquad (20)$$

Now, we can see that the fiber core should be reduced to a radius of the needle size 1.211 µm or less in order to obtain the lowest order mode. In fact, the actual core radius of the needle tip shown in FIG. 18B is determined to be 0.640 µm that is about half the size of the above calculation.

The shape of a pencil end is actually similar to a needle except that the end tip is larger. Because of their similarity, we can assume the basic physical condition as illustrated in FIG. 17C. If the pencil end is reversible, it can provide the properties that are useful as input/output devices. For example, it can spread out the high laser energy over a large area or combine the laser energy into a focal point. If no losses occur, it can lead to a higher concentration of laser energy because the power density increases with decreasing radius. In practice, some energy of the higher order ray paths will escape into the cladding. Those with lower order ray paths are left inside the fiber along the propagating process. The shape of a pencil can be formed at the end of an optical fiber. For this example, if the cladding diameter of the pencil end is measured 35 µm, then the core diameter of the pencil tip is $b_1$=2.240 µm. Obviously, the radius of this pencil tip fiber (1.120 µm) is comparable to the equation 20 as determined before. If the output power is 1.380 mW, the power density at the pencil tip can be estimated as $$J = 350.18 \times 10^6 \text{ W/m}^2$$

This power density is about 10 times higher than the flat end fiber. FIGS. 19A–C illustrate the far field radiation from the pencil tip fiber. The multi-ring pattern due to different paths of propagation can be observed. The lowest order path with the highest energy level remains principally at the center that is surrounded by about 5 rings of higher order paths. The higher order paths have much lower energy level. The pencil tip behaves as a beam concentrator-radiator. This condition can be used to control the laser power and the beam pattern depending on specific applications.

For many applications, an integration of spherical lens at the end of fiber optic may give better performance. Spherical end behaves as a ball lens that is normally used to focus light beam into or collimating light beam out of the fiber. FIG. 20 illustrates the behavior of light beam exiting from the spherical end.

The subject matter also relates to a method of shaping the tip of a fiber optic cable into shapes which enhance the launching and retrieval of light beams in accordance with the subject invention. The subject invention also pertains to the resulting optical fiber cables having tips shaped accordingly. By using electric arc or some other techniques, the end tip of fiber optic cable can be formed in different sizes and shapes. The reshaped tips normally have the physical dimensions less than a few micrometers. The subject reshaped tip can provide different characteristic of the field intensities and patterns. As a result, the method associated with launching the beam of light in to or out of the fiber can be greatly improved.

EXAMPLE 3

A specific embodiment of the subject method can be utilized for laser illumination of a spinning propeller. Illumination of the spinning propeller can improve visibility of the propeller to ground and flight deck personnel. The subject laser pattern generator can use fiber-optic technology and provide a small, low power laser illuminator with no moving parts. The subject laser pattern generator can also meet eye-safety requirements at the exit aperture of the illuminator. The subject device can be placed anywhere on the aircraft and can use fiber-optic cables to route the light to any appropriate location on the aircraft where the light can be fed through the fuselage and aimed at the front or rear of the propellers.

The subject technique can be used to enhance propeller visibility under adverse conditions. In a specific embodiment, the laser illumination can illuminate the white stripe on the propeller. A single box can house the main device with the lasers and control circuitry placed in any convenient location on the aircraft. The laser illumination can then be routed from the box to the most appropriate exit points on the aircraft fuselage using, for example, multi-mode plastic fiber optics. The resulting output laser beam can be annular in shape so as to match the stripe pattern on the propeller for maximum visibility. The laser output can be at a level to maintain an appropriate laser safety margin.

Laser Scanners can be used to design and produce propeller visibility enhancement systems. These devices are mature and reliable for the desired purposes. The laser scanners can be integrated to the Hawkeye or any similar airborne platform. The laser scanners should be mounted at appropriate mounting points on the aircraft or the carrier deck, should be rugged, should generate sufficient optical power to be observable under adverse conditions while maintaining eye safety requirements for the crew, should incorporate an optimum scan rate and pattern for maximizing propeller visibility, and should minimize integration requirements for the aircraft.

The propeller illumination system can be mounted on the aircraft. Despite their small size, laser scanners external to the aircraft can create additional drag for the aircraft. Some aircrafts do not have sufficient allowance for any external projections that would increase drag, even minutely. In a specific embodiment, only optical fibers are positioned outside the aircraft. In a further specific embodiment, the scanning system can have no moving parts.

In a specific embodiment, the propeller visibility can be enhanced by illuminating the propeller with circular patterns produced for the subject spatial mode fiber technology. A variety of fibers can be used, including, for example, silica and plastic fibers.

Figure 26:
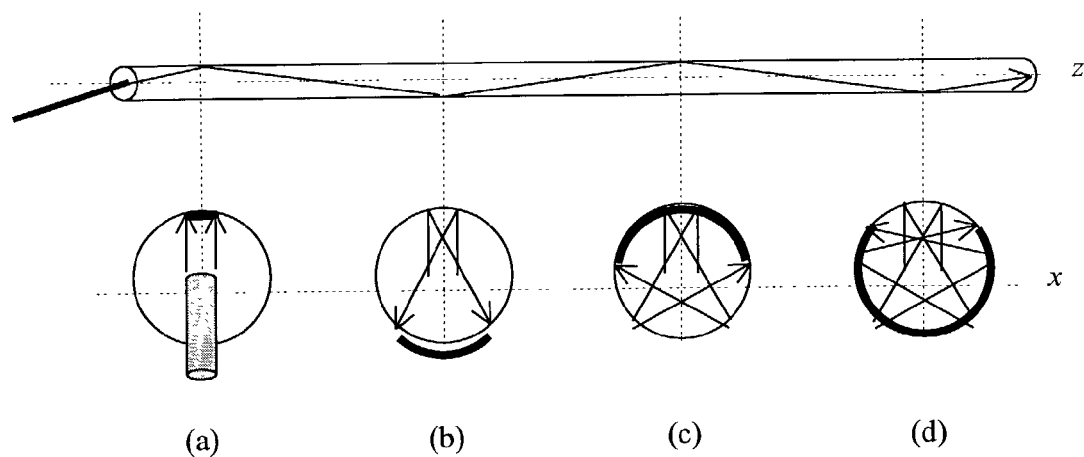
FIGS. 26A–26D shows an approximation of skew ray paths in the core of a fiber.

FIGS. 26a–26d illustrate some basic type of the ray trajectories that can be associated with angular beam injection. For simplicity, it is assumed that no loss occurs in the cladding; hence cladding region is not shown in the figure. FIG. 26(a) shows a laser beam that is launched at some angles that lies within the NA. It undergoes refraction as it enters the fiber core region but continues to travel until reaching the core-cladding boundary. At the core cladding interface it reflects off the boundary at the same angles of incidence and moves along the z-direction to the next point as shown in 26(b). Because the reflection of ray path off the core-cladding interface is periodic, it moves around in spiral form down the length of the fiber. FIG. 26 from (a) to (d) illustrate the formation of the circular helix.

Circular ring patterns can be generated without any moving part using the helical propagation properties of light. In a specific embodiment, visible circular patterns can be obtained using a laser source and plastic optical fibers. A Beam Combiner Module (BCM) and a Beam Separator Module (BSM) can be used to combine and separate multiple modes or rays that can be made to traverse the same optical fiber without interference. Silica fibers can also be used. A laser beam can be launched into the plastic fiber at various angles of incidence ($\theta_i$). Since the NA for plastic fiber is 0.5, equation (6) can be used to determine that the maximum acceptance angle is approximately 30 degrees. Hence by increasing $\theta_i$ in discrete steps from 0, 10, 20, 30, 40, and 50 degrees, we observe the variations in the conic shapes of output light. The cone images can be photographed by intersecting output rays with a flat plane parallel to the fiber axis. Thus, the physical output angles can be determined.

FIG. 10 illustrates output images for each angular input. They are photographed in sequential orders. From these images, we can determine output angles accurately as observed on the yz-plane only. We can also compare the angular input-output relations for images (a) $\theta_i=0°$, $\theta_o=12°$, (b) $\theta_i=10°$, $\theta_o=14°$, (c) $\theta_i=20°$, $\theta_o=20°$, (d) $\theta_i=30°$, $\theta_o=30°$, (e) $\theta_i=40°$, $\theta_o=37°$, and (f) $\theta_i=50°$, $\theta_o=41°$. This data tabulated in table 1 below. The angular input-output relationships are plotted in FIG. 11.

TABLE 1

Input-output angles as obtained from the experiment

| $\theta_i$ | 0° | 10° | 20° | 30° | 40° | 50° |
|---|---|---|---|---|---|---|
| $\theta_o$ | 12° | 14° | 20° | 30° | 37° | 41° |

It can be seen from FIGS. 10(a–f) that: (a) When input beam is at $\theta_i=0°$, most output intensity is dominated around the central region of the cone. (b) By increasing $\theta_i$ to 10°, the cone angles start to spread apart and also most output intensity begin to form a V-shape. For (c), (d), and (e) the angle of $\theta_i$ keeps increasing to 20, 30, and 40 degrees respectively, the cone angles spread out wider and the fine V-shape intensity is dominant. For (f), the input laser is at $\theta_i$=50°, only near field is visible.

Figure 11:
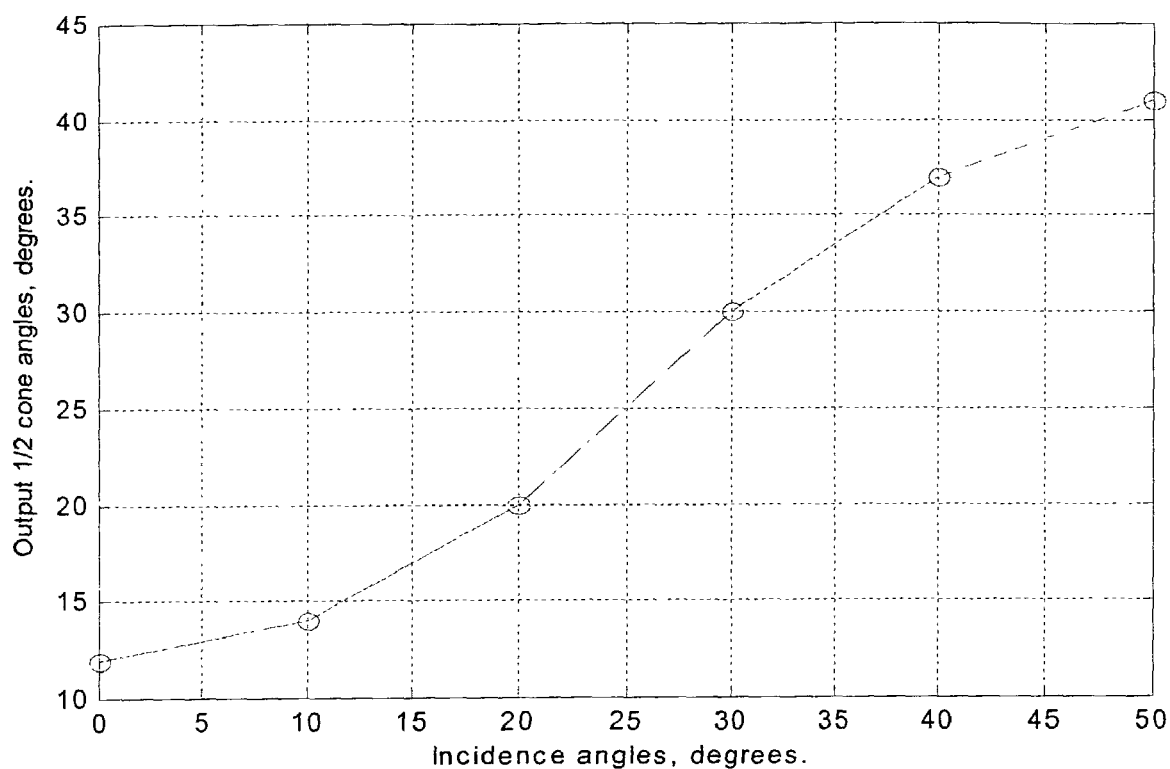
FIG. 11 is a plot of the input/output angles observed on the YZ plane of the beam of FIG. 9.

The FIG. 11 plots the relationship between the input and output angles. When incidence angle is between 0 and 10 degrees, the corresponding output cone angles are less than two degrees. For $\theta_i$ between 10 and 40 degrees, the slope of output angle is linear with respect to the input angles. This is a good range for skew beam or oblique ray excitation. It should be noted that the theoretical $\theta_{max}$ is determined to be about 30 degrees. For $\theta_i$ is over 40 degrees, the near field of output ring may be observed. At higher angular input, losses occur and the energy of light will decay and fade away.

Figure 13A:
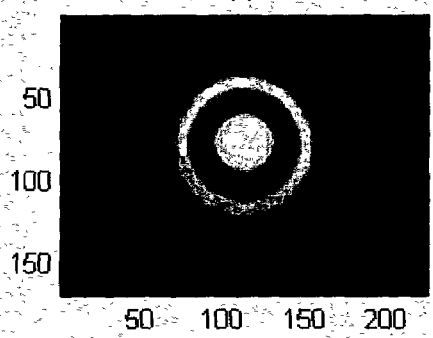
FIGS. 13A–13F are image distributions obtained by the two laser beams incident on the SDM of FIG. 9, and in particular, with both beams incident together (13A and 13B), the first laser beam incident (13C and 13D), and the second beam incident (13E and 13F).
Figure 13B:
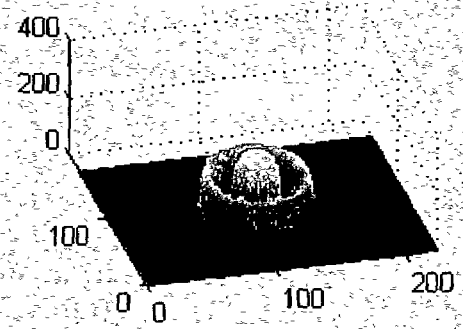
Figure 13C:
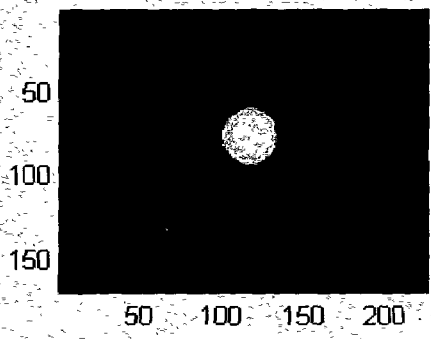
Figure 13D:
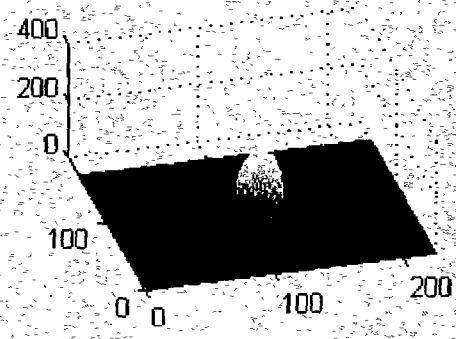
Figure 13E:
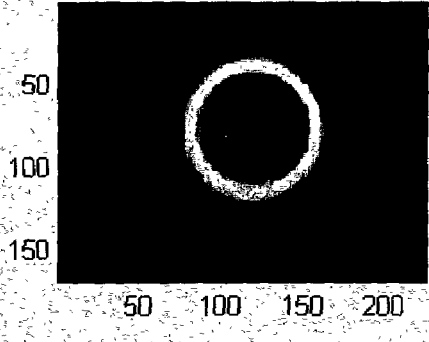
Figure 13F:
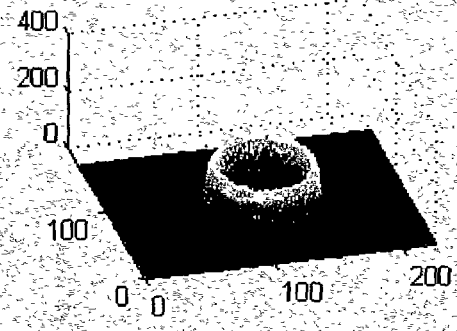

FIGS. 13A, 13C, and 13E show circular optical patterns that were generated using the helical propagation techniques. Two laser sources launching light at different angles were used. FIG. 13A shows both the result with both sources. In FIG. 13B only source launching light in the center of the fiber is turned on while FIG. 13E shows the circular pattern generated by launching a laser beam at an angle of approximately 30 degrees in a 6 meter long plastic fiber. It can be seen that plastic to maintain and transport energy of light in a helical fashion as a result of higher order beams.

In a specific embodiment, a 635 nanometer (nm) laser diode source can be used with any of several different types of optical fibers. In a further specific embodiment, the operating wavelength of the laser source can be tuned close to 580 nm, in the yellow-orange band, to maximize the eye response with minimum optical power.

Plastic fibers can be used in the subject fiber optic laser light projection system. An oblique injection of rays can be used, i.e. the laser beam can be launched into the fiber optic cable at some predetermined angle. Angular beams or rays of light tend to reflect off the core-cladding interface and can propagate in a spiral or helical fashion inside the optical fiber cable. Upon exiting at the other end of the fiber, the light spreads out into a conical beam. When the aircraft propeller blades intersect this laser-projected beam, a ring of laser light or a circular pattern can be clearly visualized. In a specific embodiment, the main components for this laser light projection system can be a Helium-Neon laser system and a spool of plastic fiber.

Figure 27:
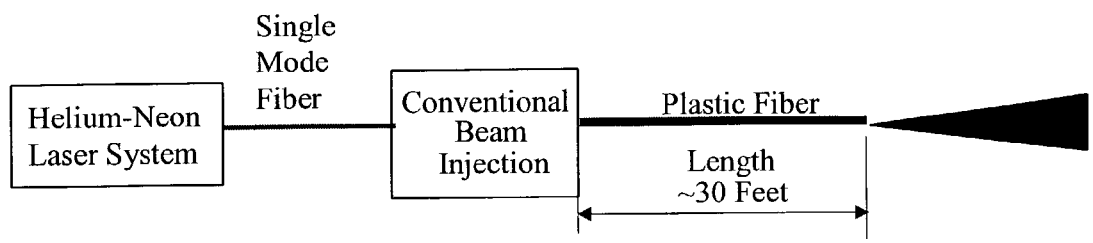
FIG. 27 shows a functional block diagram of a fiber optic laser light projection system in accordance with the subject invention.

A functional block diagram of a fiber optic laser light projection system is illustrated in FIG. 27. The basic system consists of the Helium Neon laser source, a short length of single mode silica fiber, a conventional angular beam injection unit and approximately 30 feet long plastic fiber.

As shown in the block diagram of FIG. 27, a Helium-Neon laser source with an output wavelength in the visible range of 632.8 nm can be used to launch light in to the projection system. A three-dimensional mechanical fiber coupler and focusing lens system can be used to couple light from the Laser source to a glass fiber. The length of the glass fiber was roughly 5 feet. The laser source to fiber coupling was optimized for a Gaussian beam profile and the total optical power exiting the other end of the silica fiber was measured to be 1.45 milli-watts. Though a single mode fiber was used in this experiment, a multimode fiber can also be used. The output energy is illustrated in FIG. 16. It should be noted that the flat peak in FIG. 16(c) is due to the saturation of the CCD array of the camera and the actual image was Gaussian in nature.

An experimental setup using plastic optical fiber utilized visible laser in the red region of electromagnetic spectrum at 632.8 nm from a Helium-Neon laser source. A laser beam was launched in to the plastic fiber at oblique angles into the plastic fiber to generate and study the field pattern at the output end. The total length of the plastic fiber used in this experimental setup was approximately 30 feet.

At the beam injection point, the angle of the launched beam can be mechanically controlled with the help of a three-dimensional xyz coupler. For successful projection of the output ring or any other desired pattern, the launching angle is preferably within the numerical aperture of the fiber. Generally, plastic fibers have a large numerical aperture, and, therefore the ability to collect more light. For most of our experiment, the launching angle was adjusted to approximately 12 degrees. The objective was to force the fields of propagating optical energy to follow a helical path inside the fiber, such that it exits the fiber in a conical shape to produce circular ring patterns. When the incident angle of the light beam entering a fiber is properly controlled, a circular ring pattern can be projected at the output end. In a loss-less media or in a short length of plastic fiber, the output cone angle is approximately equal to the incidence angle at the input.

For output measurements and analysis, a simple method of imaging was used to record and plot actual results. The field energy of skew beams exiting the fiber end can be determined by using analytical geometry. The output behavior of obliquely injected laser beams can be studied by a conical evaluation technique. In addition to the simplistic conic section, the field pattern can also be described by electromagnetic field theory and Maxwell's equations.

Standard optical fibers can be assumed as uniform solid cylinders. When properly guided, an optical beam can be transmitted with negligible losses. For a positive waveguide, the core refractive index of the fiber is slightly greater than that of the cladding. The curved boundary at the core-cladding interface acts as a cylindrical reflector, where total internal reflection of the transmitted ray of light takes place. For rays of light that enter the fiber at appropriate angles, the reflections at the curved boundary causes the ray of light to propagate the length of the fiber in a spiral like or helical fashion. The circular helix motion of optical energy in fiber cables is possible due to the refractive index profiles of the core-cladding materials and the cylindrical structure of fiber optic cables.

This motion literally occurs at the speed of light. As the laser light exits the fiber, a three dimensional circular cone of laser beam is produced that diverges quickly in free space. By intersecting the circular cone of light with a flat panel on the fiber axis, the V-shape cone of laser beam can be obtained. If the flat panel is placed perpendicular to the cone axis, a circle or circular ring results. The propeller blades can act as a flat panel placed perpendicular to the fiber.

Figure 28:
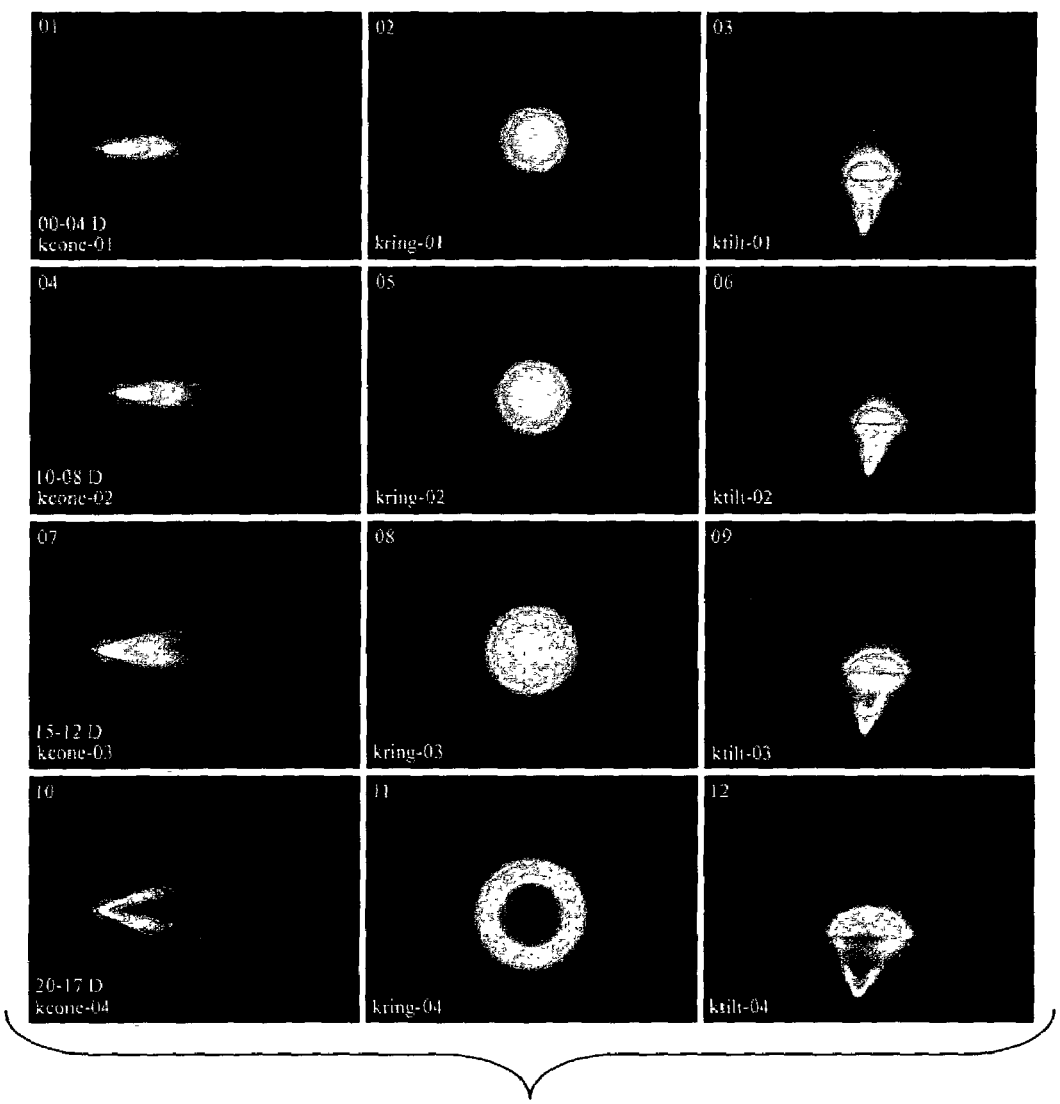
FIG. 28 shows the output from a laser projection system with plastic fibers in accordance with the subject invention.

The plastic fiber is not the most popular candidate for standard fiber optic telecommunications applications, due to relatively high attenuation; it is widely used for transmission of optical signals over short distances. The major advantage of plastic fiber lies in its simple and easy handling. When an angular laser beam is launched into the plastic fiber, the observed output field pattern will be similar to that shown in FIG. 28. FIG. 28 graphically depicts the results obtained from an experiment where the laser beam is launched into the plastic fiber at various angles of incidence. From the specifications sheet of the plastic fiber, it was determined that the maximum acceptance cone angle for the fiber was about 30 degrees. Hence, a number of incident angles were possible. By changing the launching angles or the incident angles of laser beam at discrete steps from 0, 10, 15 and 20 degrees for example, we can create a variety of conical or circular shapes. From this experiment, the V-shape conical beam of output laser light can be observed in the first column of FIG. 28. The second column illustrates the corresponding circular ring patterns. The third column combines both, the V-shaped conical pattern and a semicircle in the same picture.

In order to make the propeller, blades visible at night, it was determined that the far field illumination for such a system can, preferably, use at least a few milli-watts of optical power. In addition, the plastic fiber waveguide can be uniform with low attenuation factor. The Helium Neon Laser source used in these experiments could couple about 1.45 mW into the fiber. Though the quality of the projected laser beam was satisfactory, the plastic fiber offered a relatively high attenuation of 0.5 dB/m. In addition, the volume and weight of the plastic fiber and He—Ne based system is huge as compared to silica based fiber and mating semiconductor laser diode system. Glass fiber and pigtail semiconductor laser diode based systems can be used as well.

Suitable far field illumination intensity is highly desirable for a successful propeller visibility enhancement system. The fiber optic laser light projection system can provide the required far field illumination if sufficient optical power is available at the propeller end of the system. The desired illumination intensities can be optimized by using (i) high power laser source, (ii) low loss fiber system and (iii) by shifting the operating wavelength of the laser source to a wavelength as close to the human eye's photopic response peak of 555 nm (nanometers) as possible. These goals can be achieved with the help of silica based fibers and pigtail laser diodes as both low loss and power levels approaching the safety limits of human eye are readily available in high efficiency semiconductor devices. Laser diodes with operating wavelength of 635 nm are readily available while semiconductor devices operating at wavelengths close to 555 nm may be available in the near future. Additionally this system is compact, lightweight and highly power efficient.

Figure 29:
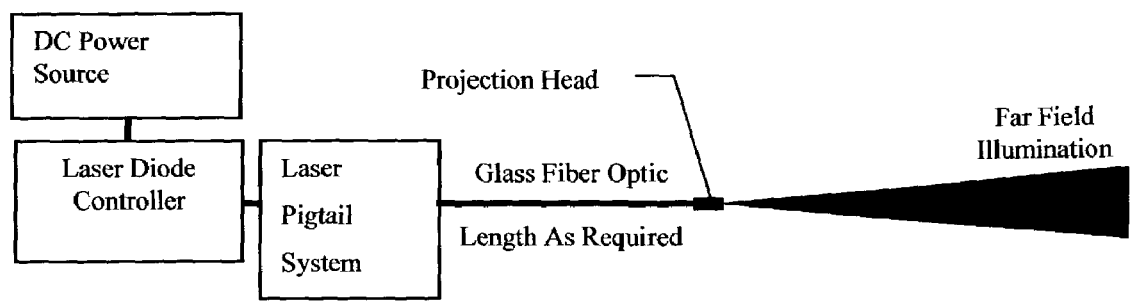
FIG. 29 shows a fiber optic laser light projection system in accordance with the subject invention.

A basic configuration of a specific system in accordance with the subject invention can include standard communications grade silica fiber, a dc-power source, a variable laser diode controller, a laser pigtail system or equivalent and a projection head. Such a configuration is shown in FIG. 29.

The laser light projection system can operate directly from a dc power source. Any appropriate dc battery or an AC/DC converter can be used to generate the required power for the laser driver controller circuitry, as long as the power source is capable of providing sufficient power to drive the electronics and the laser system.

The laser diode driver is an electronic system that regulates the output power from a given source by generally controlling the current injected into the system. A variable laser diode controller may also be used to control the output power over a broad range. These units are designed to pump sufficient power to drive the laser diode with maximum efficiency. Two different variable laser drivers were used in these experiments: (1) a 500 mA laser diode driver from Thorlabs Inc, and (2) a 95 mA custom design laser driver.

The Thorlabs laser diode driver, IP500 is equipped with constant current, constant power and safety controls. There is an auto alarm shut down when laser connection is open or reversed. The control range can be set by 25 turn potentiometers to govern supplying current up to 500 mA. It requires two voltage levels (+5V and −5V) for proper operation. Two test points are provided to monitor the current flowing through the laser diode. The unit is also capable of supporting all pin configurations of laser-diode modules in either constant current mode or constant power mode. Onboard jumpers can be used to configure the operating modes. It accepts photodiode feedback currents of up to 2.0 mA.

The custom design laser diode driver was developed at Florida Tech., to enable system operation from a unipolar voltage source. It is a simple design that enhances the overall system reliability and minimizes the size and weight requirements. The controller unit can operate from a single voltage level dc power source from 3–7 volts. A potentiometer is provided for initial adjustment of drive current. Access points are provided to measure laser diode current and a two-pin socket is installed on the pc board that can accept almost any standard laser diode pin configuration. This adjustable driver can pump a maximum current 95 mA into the circuit.

A laser pigtail system can be the source of optical radiation. This is the biggest component on the driver board and is generally installed vertical to the plain of the driver board. The pigtail laser diode is used to replace the conventional Helium-Neon laser equipment. The complete package is smaller in size and its performance is highly efficient. Output power can be adjusted by controlling the current injected from the laser diode driver board. A broad range of operating wavelengths is available. The silica based fiber optic laser projection system used laser sources operating at 635 nm and 660 nm.

The Fiber optic is a dielectric waveguide and is used to transmit optical energy efficiently from one point to another. Most fiber optic cables are composed of a core region and a cladding region. Acrylate buffers and other protective jackets are often added to enhance the mechanical properties of fiber. For a positive waveguide, the core refractive index is higher than the cladding refractive index. Based on the differences of the core and cladding refractive indices, light can propagate through the fiber optic by means of the total internal reflection scheme. The silica-based fiber is the medium of choice as its attenuation is very low as compared to plastic fibers or polymer based fibers.

The laser light projection head is designed and configured to produce circular patterns of reasonably high intensity in the far field. The projection head can be designed in a variety of sizes from a host of different optical waveguide materials suitable. The projection head can also be designed as a removable module that can be changed or repaired for easy maintenance. FIA 100011001300 Ultra Low OH Silica/Silica optical fiber was used as the projection head.

A laser projection system was built using Thorlabs laser diode driver IP500. All power supplies and jumpers are carefully configured to match the required pin format of laser being used. The driver board was configuring to operate in the constant current mode. The laser pigtail unit was installed on the universal breadboard next to the laser driver board.

After properly securing the required connections, the power supply was switched 'on'. In order to monitor the laser diode current, a voltmeter was connected across the prescribed test points. The value of voltage is read and converted to a value of currents by means of the Thorlabs transfer function. For the laser driver IP500 model, the transfer function is 1V/1A with a maximum adjustment of approximately 0.5V corresponding to 500 mA. It was observed that the system required both positive and negative voltage and can end up injecting higher than desired current to the laser diode in case of loss of one of the supplies.

Optical power outputs of two pigtail laser diodes (LPS-3224-660-FC & LPS-3224-635-FC) were evaluated for calibration purposes.

The LPS-3224-660-FC, operates at 660 nm and is mainly composed of Hitachi HL6501MG laser diode. The threshold current is approximately 45 mA. Typical operating current is 65 mA and it can handle a maximum current of 95 mA. Operating voltage is 2.6 volts nominal. The absolute maximum rating optical output power (CW) is 35 mW. The power outputs ($P_0$) relative to the driving current ($I_0$) were tested and recorded in table 6-1 below. The power meter used in this measurement is the Photom Model-211 mini power meter manufactured by Haktronics Co., Ltd. The unit has maximum reading of power up to 5.0 dBm. Therefore, the meter does not register at driving current greater than 78 mA as indicated in table 2.

TABLE 2

Laser diode HL-6501MG power outputs relative to the driving current

| $I_D$ (mA) | $P_0$ (dBm) |
|---|---|
| 45.0 | −19.3 |
| 50.0 | −6.6 |
| 55.0 | −1.8 |
| 58.0 | 0.0 |
| 60.0 | 0.8 |
| 61.0 | 1.0 |
| 65.0 | 2.3 |
| 67.0 | 3.0 |
| 70.0 | 3.7 |
| 71.0 | 3.9 |
| 72.0 | 4.1 |
| 73.0 | 4.3 |
| 74.0 | 4.6 |
| 75.0 | 4.8 |
| 76.0 | 4.9 |
| 77.0 | 5.0 |
| 78.0 | High |

The LPS-3224-635-FC, emits laser radiation at an operating wavelength of 635 nm and is made of a Hitachi HL6320G laser diode. The threshold current is 75 mA maximum. The threshold current was 45 mA and the operating current can current can go as high as 95 mA while the operating voltage is 2.7 volts. The absolute maximum rating optical output power (CW) is 10 mW. Again a Photom Model-211 mini power meter was used for optical power measurement. The power outputs ($P_0$) relative to the driving current ($I_0$) were tested and are presented in table 3 below.

TABLE 3

Laser diode HL-6320G power outputs relative to the driving current.

| $I_D$ (mA) | $P_0$ (dBm) |
|---|---|
| 45.0 | −22.6 |
| 50.0 | −8.3 |
| 55.0 | −4.3 |
| 60.0 | −2.2 |
| 65.0 | −0.8 |
| 68.0 | 0.0 |
| 70.0 | 0.3 |
| 71.0 | 0.5 |
| 72.0 | 0.6 |
| 73.0 | 0.8 |
| 74.0 | 1.0 |
| 75.0 | 1.1 |
| 76.0 | 1.1 |
| 77.0 | 1.2 |
| 78.0 | 1.2 |
| 79.0 | 1.1 |
| 80.0 | 1.0 |
| 81.0 | 1.0 |
| 82.0 | 0.8 |
| 83.0 | 0.7 |
| 84.0 | 0.6 |
| 85.0 | 0.5 |

The data in table 2 shows that the HL6320G laser diode provides optimum optical power when the current is around 77–78 mA. This current yields a maximum-coupled optical power output of 1.2 dBm, which corresponds to nearly 1.3 mW of CW optical power coming out of the optical fiber. Increasing current beyond 78 mA does not increase the optical power despite a maximum current rating of 95 mA.

The Far Field Projection

Figure 30:
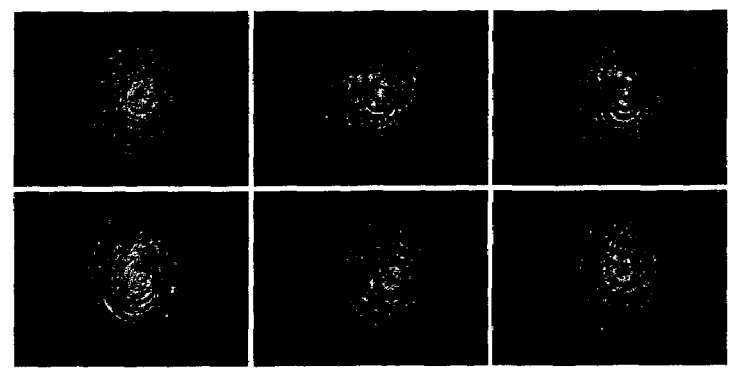
FIG. 30 shows examples of the far field patterns produced by a specific laser light projection system.

Selecting appropriate light launching angles can generate a number of different far field patterns. The injection of laser light into the system is critical and must be in good alignment with the projection head. In these experiments, the angles and position of injected light was mechanically controlled using adjustable micrometer. The projection head is mounted on an adjustable 3-dimensional (x-y-z) positioning stage. By carefully adjusting the positioning stage, multiple output field patterns including those shown in FIG. 30 can be obtained.

To develop better understanding of the system behavior, another set of experiments involving discrete steps was performed. This experiment Thorlabs laser driver board model IM500 and the HL6501MG laser diode unit. The driving current was fixed to approximately 60 mA, which yielded an output power 0.8 dBm. After reaching the best alignment between the pigtail laser source and the center of the projection head, the x and z positions were fixed. By moving the y-axis or the vertical position alone, field energies with different patterns were observed. Starting the y-position at the top edge of the projection head and gradually moving vertically downward at discrete steps, the actual behaviors of laser field patterns were recorded and those field patterns are presented in FIG. 31.

Two different sets of experiments were conducted to make sure that this system is suitable for aviation industry specifically for the E2C hawk eye aircrafts. The first set of experiments involved illuminating the propellers of a wind tunnel at Florida Tech. This experiment was performed to simulate real world environment and determine the visibility issues associated with the propellers. From this experiment it was deduced that there is little advantage in illuminating the whole propeller because the energy density is distributed over the whole surface, which sacrifices visibility. On the contrary if there are only one or two output optical rings the energy density is much higher and the visibility is greatly enhanced due to increased contrast. Hence a second set of experiments was performed by projecting a single output optical ring on the propellers of a Piper Warrior III aircraft owned by Florida Tech. The designed propeller visibility enhancement system was clearly able to paint a visible circle at the edges of the moving propellers. The edges of the revolving propeller were glowing with a reasonably bright red circular pattern, which was clearly visible to the naked eye under poorly illuminated conditions in a dark corner of Melbourne International Airport. The proof of principle demonstration of this propeller visibility enhancement system can serve two purposes: (a) To illuminate the propeller blades when the engine is running, and (b) To simultaneously illuminate the perimeter of danger zones on the ground floor.

A bright ring of laser light with high contrast can be generated using the system shown in FIG. 29. A small lens is added to for the purpose of focusing more light into the projection head. This performance of this system is preferred over the earlier versions in the following ways.

This provides a circular ring of uniform intensity.

The visibility is improved due to greater background contrast.

The diameter of the ring produced by the laser light can be controlled.

The visibility circular ring is much brighter and better because of higher energy density greater contrast.

In the experiment, the silica fiber based laser projection system for propeller illumination was places in front of a single engine aircraft Piper Warrior III aircraft. The diameter of the propeller blades of the aircraft was approximately 6-feet and the projection system was sitting at a distance of approximately 16 feet from the propeller blades.

This experiment successfully proved the edges of the rotating propeller blades were clearly painted by a circular ring of red laser light. This illuminated ring pattern was visible to the naked eye both from the front and sides of the aircraft.

In order to properly design the illuminator for the propeller it is necessary to determine the minimum required power to produce a visible pattern on the propeller for the observer. First we need to ascertain the minimum detectable power a human can see. FIG. 26 represents the sensitivity of the night adapted human eye in for on and off axis viewing (fovea and 10° from fovea) in millilamberts.

From the graph we can see that the minimum sensitivity appears to be about $2 \times 10^{-3}$ milliLamberts for on fovea illumination. We are not really interested in the off-axis scenario even though it is more sensitive, as it isn't realistic to expect people to not be looking directly at the propeller. Also, on fovea illumination represents a worst-case condition.

We need to convert this number to a laser power number in Watts so we can design the illuminator. A Lambert is $1/\pi$ candles/cm$^2$, and a candle is one lumen per steradian so:

Lambert=$1/\pi$ lumens/steradian/cm$^2$

A lumen is a photometric measurement that is relative to the response curve of the human eye. The conversion from lumens to Watts depends on the wavelength of the light. The standard procedure is to compute the power for the peak of the human eye response at 555 nm, which is:

1 Watt=680 lumens @555 nm

This means our minimum sensitivity is:

$2 \times 10^{-6}$ Lamberts$\times 1/\pi \times 1/680$ Watts/lumen=$9 \times 10^{-10}$ Watts/steradian/cm2

We want the light from the propeller to be scattered uniformly in all directions this means scattering into a $4\pi$ solid angle, so the illumination on the propeller needs to be:

Intensity (Watts/cm$^2$)=$4\pi \times 9 \times 10^{-10}$=$1.2 \times 10^{-8}$ Watts/cm$^2$ @ 555 nm Now we need to figure out how big an area we intend to illuminate on the propeller. There are two ways we can illuminate the propeller, first we can illuminate the white band near the tip of the propeller and track the blade as it rotates with the scanner, this mechanism provides the lowest output power from the laser source, but has issues with alignment of the laser with the propeller and in synchronizing with the propeller rotation. The other way is to cause the scanner to rotate at high speed counter to the propeller rotation this would ensure that the laser crossed the propeller several times during a single propeller rotation and not require any synchronization, but would require more power as the laser would only be striking the propeller surface for a fraction of the time. To calculate these numbers we need some hard information as to the diameter of the propeller, its width, its rotation rate, and the location of reflective striping on the propeller. For these calculations we can use the following:

Propeller diameter=295 cm

Propeller width=40 cm (about 16 inches)

Propeller count=4 blades

Rotation Rate=about 1000 rpm

Beam diameter on propeller=0.3 cm

For the case of tracking the propeller blade tip we can calculate the area of the illuminated ring:

Area=$\pi \times$Propeller diameter$\times$Beam diameter=278 cm$^2$

The total power output of the laser required to illuminate the blade at a minimal observable power level is:

Power=Intensity$\times$Area=$1.2 \times 10^{-8}$ Watts/cm$^2 \times 377$ cm$^2$=$3.3 \times 10^{-6}$ Watts @555 nm For our scenario of the beam illuminating a semi-circle that the propeller sweeps, at any given instant we are only illuminating a fraction of the semi-circle based on the percentage of obscuration of transmission provided by the propeller:

Percentage Obscuration=4 blades$\times$40 cm width/($\pi\times$Propeller diameter)=0.17

Figure 33:
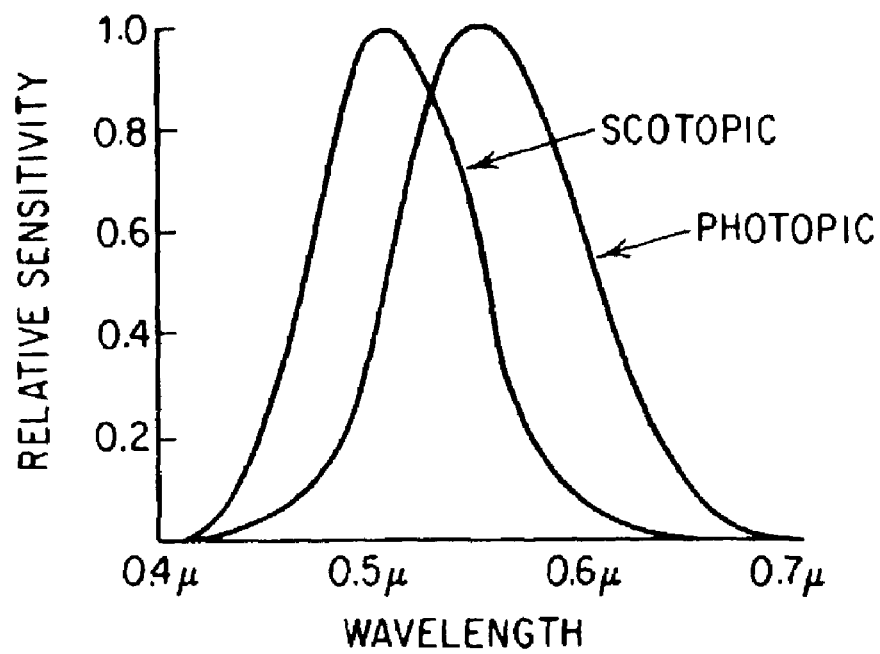
FIG. 33 shows the relative eye response for photopic and scotopic vision.
Figures 34, 35:
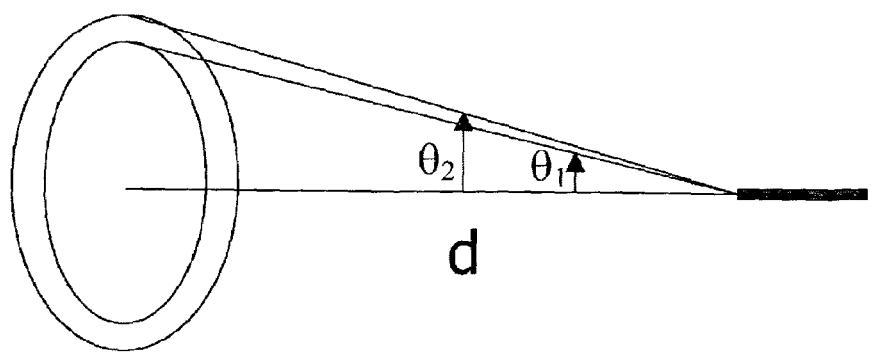
FIG. 34 shows the relative eye response numbers for various wavelengths.
FIG. 35 shows a ring having a divergence angle inside radius $\theta_i$ and a divergence angle outside radius $\theta_2$.

In order to scatter the same amount of energy into the eye of the observer the output power will have to be scaled by the reduction in returned power based on percentage of the obscuration:

Power (counter)=Power (synch)/Percentage Obscuration=$1.9 \times 10^{-5}$ Watts @555 nm The 555 nm wavelength is the peak spectral sensitivity of the human eye. This wavelength is in the green-yellow part of the spectrum and availability of laser diodes for the scanner may be limited. A more common wavelength is that used in laser pointers 635 nm and the one our device is initially designed to work at. Unfortunately, the response of the eye at this wavelength is only 22% from that at the peak see FIGS. 33 and 34.

At 635 nm, our currently projected operating wavelength, our power requirements go up to $1.5 \times 10^{-5}$ Watts for synchronous and $8.6 \times 10^{-5}$ Watts for continuous illumination of the whole propeller. If we only illuminate the bottom half of the propeller power requirement drops to $4.3 \times 10^{-5}$ Watts. Table lists the minimum power output requirements for various wavelengths to ensure visibility to human observers:

TABLE 4

Minimum Power Requirements for Visibility at Various Wavelengths

| Wavelength (nm) | Minimum Visible Power Synchronous | Minimum Visible Power Continuous |
|---|---|---|
| 555 | $3.3 \times 10^{-6}$ | $1.9 \times 10^{-5}$ |
| 570 | $3.4 \times 10^{-6}$ | $2.0 \times 10^{-5}$ |
| 600 | $5.2 \times 10^{-6}$ | $3.0 \times 10^{-5}$ |
| 630 | $1.2 \times 10^{-5}$ | $7.1 \times 10^{-5}$ |
| 670 | $1.0 \times 10^{-4}$ | $5.9 \times 10^{-4}$ |

The maximum permissible exposure (MPE) for human beings is given in ANSI Z136.1 published by OSHA. From ANSI Z136.1 the equation that covers this is $$MPE = 1.8 \, t^{3/4} \times 10^{-3} \text{ Joules/cm}^2$$

Assuming a blink response of 0.25 seconds (industry standard) then the MPE for the eye is:

$$MPE = 6 \times 10^{-4} \text{ Joules/cm2}$$

Or a maximum permissible intensity of:

$$MPI = 6 \times 10^{-4} \text{ Joules/cm}^2 / 0.25 \text{ seconds} = 2.4 \times 10^{-3} \text{ Watts/cm}^2$$

Assuming a 7 mm pupil diameter for a fully night adapted eye and then if the total fiber output were to enter the human eye it would have an area of $$\text{Area (pupil)} = (\pi (0.7 \text{ cm})^2)/4 = 0.38 \text{ cm}^2$$

Then the maximum permissible power would be:

$$MPP = MPI \times Area = 2.4 \times 10^{-3} \text{ Watts/cm}^2 \times 0.38 \text{ cm}^2 = 9 \times 10^{-4} \text{ Watts}$$

Clearly from the visibility analysis there is plenty of room to work with at 555 nm between the minimum required power output and maximum permissible exposure. At 635 nm there is almost a factor of 10 between the minimum power output required for visibility and maximum permissible exposure. These numbers represent the worst-case scenario of all of the laser power emitted by the illuminator entering the eye. If we design the exit optics appropriately we can ensure that the minimum diameter of the circular pattern is at least an inch. This would spread the output energy over a length of $2.54 \text{ cm} \times \pi/2 = 40$ mm instead of 7 mm. Thus our minimum observable power density at 635 nm would be $3.6 \times 10^{-5}$ Watts/cm$^2$ versus the $2.4 \times 10^{-3}$ Watts/cm$^2$ density for maximum permissible exposure, which is over a factor of 100.

If we can restrict how close personnel can get to the fiber optic output, either through beam forming optics or by placing a shield around the exit we can boost the power to enhance visibility. Based on the measurements we made on the aircraft the following parameters apply:

| | |
|---|---|
| Distance from fiber to propeller | d = 128 inches |
| Inner radius of white stripe | $r_1$ = 56 inches |
| Outer radius of white stripe | $r_2$ = 59 inches |
| Divergence angle inside radius | $\theta_1$ = 0.45 radians |
| Divergence angle outside radius | $\theta_2$ = 0.48 radians |

The area of the annulus as a function of distance from the fiber optic exit is:

$$\text{Area} = \pi d^2 [\sin^2(\theta_2) - \sin^2(\theta_1)]$$

Knowing the MPI and the laser power (Power) we can then solve for the distance we need to be from the fiber end to be eye safe without any additional optics:

$$d = \sqrt{\frac{\text{Power}}{MPI \cdot \pi \cdot (\sin^2(\theta_2) - \sin^2(\theta_1))}}$$

For various output powers we then have the following standoff distances from the fiber exit for eye safety

TABLE 5

Safe Eye Standoff Distance for Various Output Powers

| Power (mW) | Standoff Distance (cm/inches) |
|---|---|
| 1 | 2.3/0.9 |
| 5 | 5.3/2.1 |
| 10 | 7.4/2.9 |

Long Range Visibility

We can use the above equation to determine the long-range visibility of the source. In this way we can determine how far from the aircraft the propeller illuminator can be seen for any radiation that fails to contact an aircraft surface. In this case we replace the value for the MPI in the above equation with the minimum detectable power for the human eye divided by the area of a night-adapted pupil (0.38 cm$^2$)

TABLE 6

Maximum Visible Range of Illuminator for a 10 mW source

| Wavelength (nm) | Minimum Visible fluence (Watts/cm$^2$) | Visible Distance Meters/feet |
|---|---|---|
| 555 | $1.2 \times 10^{-8}$ | 33.2/109 |
| 570 | $1.1 \times 10^{-8}$ | 32.5/106 |
| 600 | $1.9 \times 10^{-8}$ | 26.4/86.7 |
| 630 | $4.5 \times 10^{-8}$ | 17.1/56.2 |
| 670 | $4.0 \times 10^{-7}$ | 5.8/18.9 |

Figure 36:
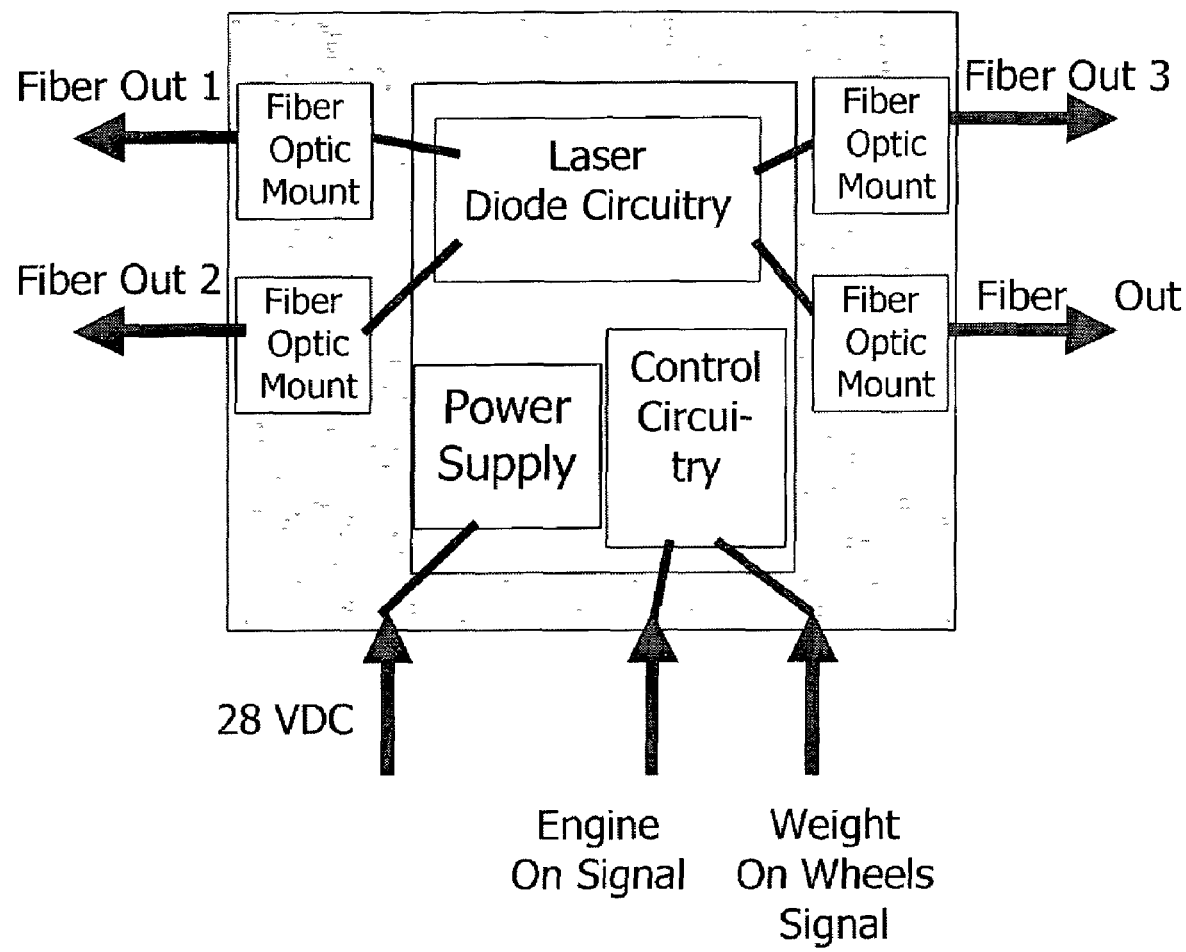
FIG. 36 shows connections of an Illuminator Box.

A specific embodiment comprises a central laser illuminator box with the laser diodes, fiber-optic connections, and control electronics. There will only need to be one box per aircraft, although multiple boxes can be employed for redundancy or ease of installation reasons. The laser illuminator box can provide four fiber-optic connectors for illumination of two propellers, front and back, one 28VDC input power connector, one weight on wheels signal input, and one signal for indication of propeller rotation/engine on (FIG. 36). The maximum size of the box in any dimension is estimated to be 6 inches.

The weight on wheels input is essential to ensure that the illuminator turns off automatically following launch and turns on automatically following landing. A control signal indicating the propeller is turning or the engine is on is essential to ensure that the illuminator is only on during propeller operation, otherwise an action by the flight crew would be required to activate the illuminator. Just applying power to the bus, is inadequate as there are clearly times when electrical power is applied to the aircraft for maintenance purposes but the engines are not operating and it would be inappropriate for the illuminator to activate.

Figure 37:
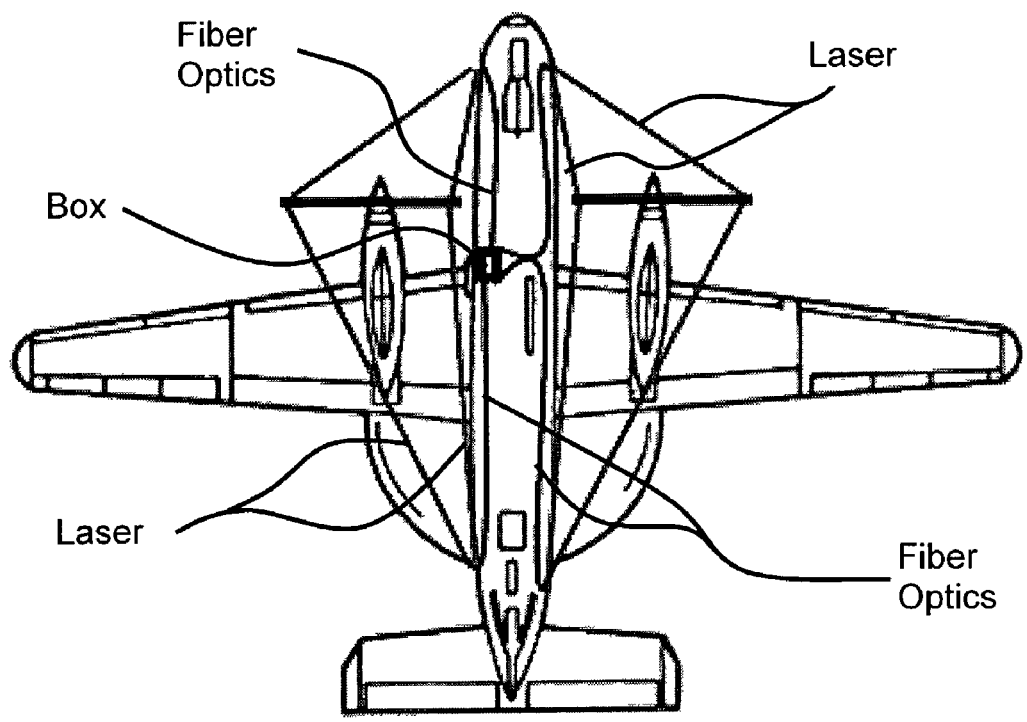
FIG. 37 shows a hypothetical installation, box and fiber optics, and laser.

The box could be placed anywhere on the aircraft that would provide a convenient space with minimal signal/power routing requirements. Plastic fibers would be run from the outputs to appropriate exit points on the fuselage that have a field of regard including the front and back of the propellers (FIG. 37).

Figure 38:
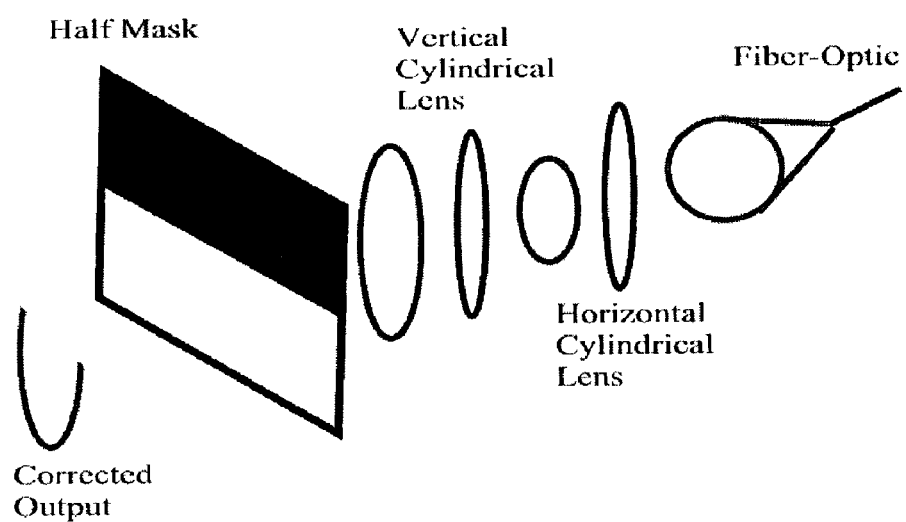
FIG. 38 shows a specific fiber-optic Output Head.
Figure 39:
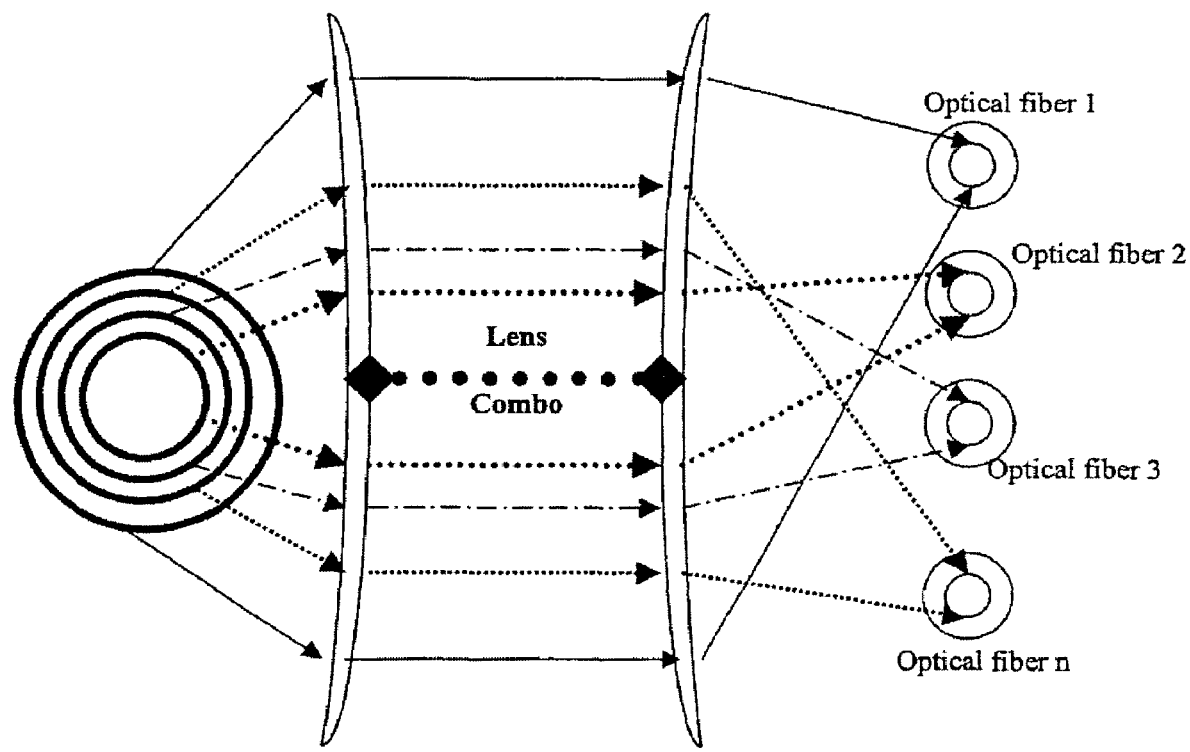

In order to ensure the circular pattern matches the white striping on the front and back of the propeller, regardless of the fiber-optic exit placement or look angle to the propeller, the output end of each fiber-optic may require a beam forming attachment. The beam forming attachment can include at least three elements, a horizontal and vertical cylindrical lens to provide elliptical shape correction to the illumination profile, and a half mask that would mask off the top of circular beam profile. The horizontal and vertical cylindrical lenses are necessary to correct for elliptical distortion induced by the fact that the cylindrical illumination pattern will be traveling toward the propeller from and off-axis position, either up or down, and from the left or right. Without the correction the pattern on the propeller would be and ellipse and not a circle and hence would not track the white striping correctly. The half-mask is necessary to ensure that only the bottom half of the propeller is illuminated. During discussion with NAWC personnel we determined that strict control of the laser beam destination was required. It is undesirable to allow the illuminator to propagate in free space without coming into contact with an aircraft surface (wing/flap) or the ground shortly after passing the propeller. NAWC personnel assured us that illuminating the top half of the propeller was not required. By masking off the top half of the illuminator's circular profile, we eliminate the possibility that laser illumination would be visible outside a reasonable perimeter from the aircraft (FIG. 38).

EXAMPLE 4

The subject invention can introduce optical energy into optical fibers such that the optical energy follows a helical path inside the optical fiber. In this way helical or circular patterns of light exiting such fibers can be generated. This helical propagation can be used to generate a number of patterns including circular, semicircular, and helical patterns. This technique does not require any moving parts for pattern generation. This technique can be utilized with respect to security related applications.

Figure 31:
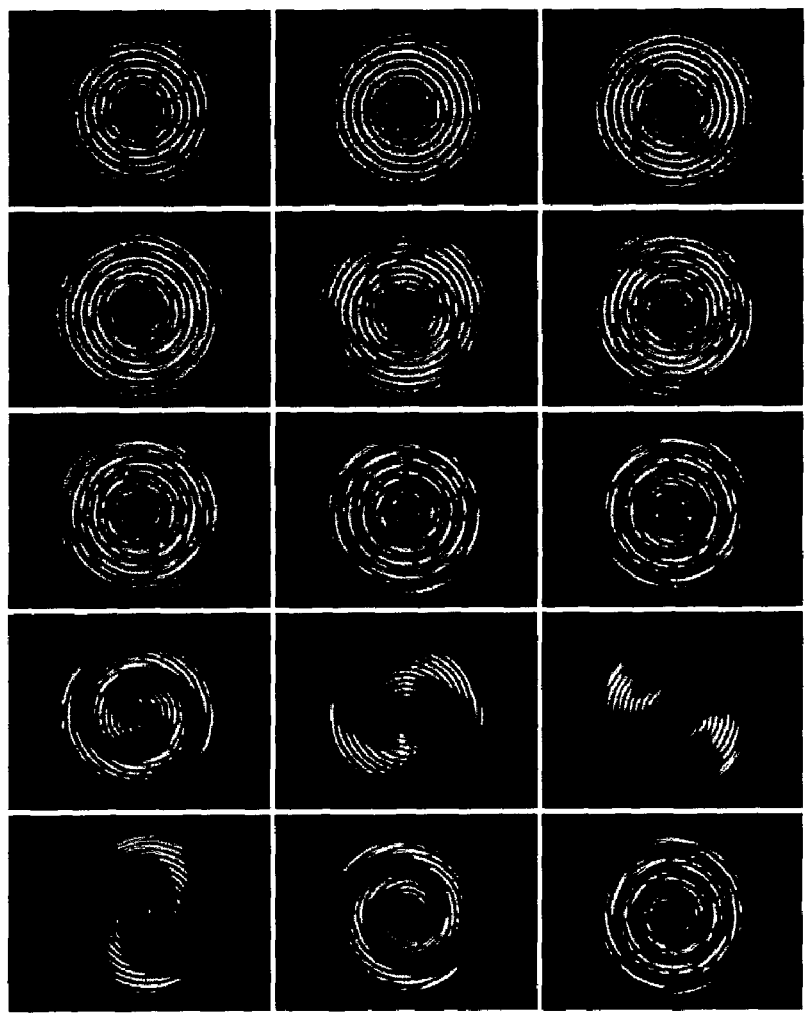
FIG. 31 shows representative far field projections of specific laser light output patterns.
Figure 32:
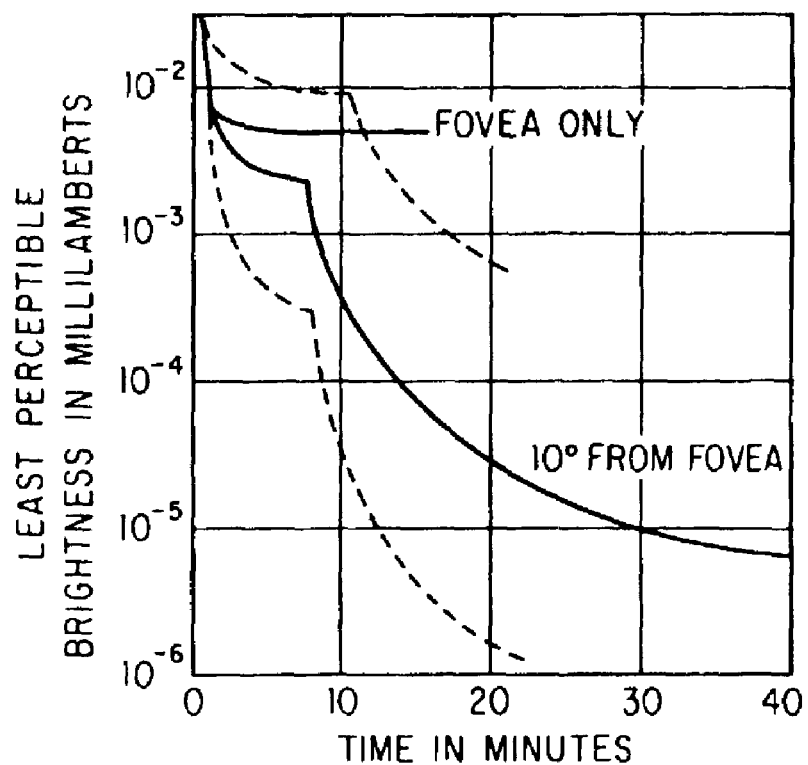
FIG. 32 shows the threshold of visibility for human eye.

One or more of the output patterns shown in FIG. 31, or other possible patterns, can be created around a mobile or stationary asset simply by turning 'on' a switch. Hence this system can be deployed in no time at any location with the help of an airborne platform or something similar. Optical sensors such as streak, tube cameras can be utilized to detect a break in the light pattern and, therefore, detect any intrusion around the assets. This technique can be used to secure mobile assets.

The subject method and apparatus can be utilized, for example, to provide perimeter security or missile defense.

EXAMPLE 5

The subject invention can also be utilized to spatially modulate data and/or encrypt data. The subject technique can be similar to 'mode hopping inside optical fibers,' but instead of changing the frequency of the light carrying the data the light can be switched from one spatial channel to another within the fiber.

The subject method to encode the transmission of digital data (or analog) on an optical fiber can be used in addition to existing data encryption techniques. This process can enhance the security of the data without additional channel bandwidth.

The light propagating down and exiting a fiber, or other waveguide, can be spatially modulated as a function of input excitation angle. Multiple optical channels can be modulated on a single optical fiber, or other waveguide, such that each channel occupies unique spatial (model) locations.

Figure 22:
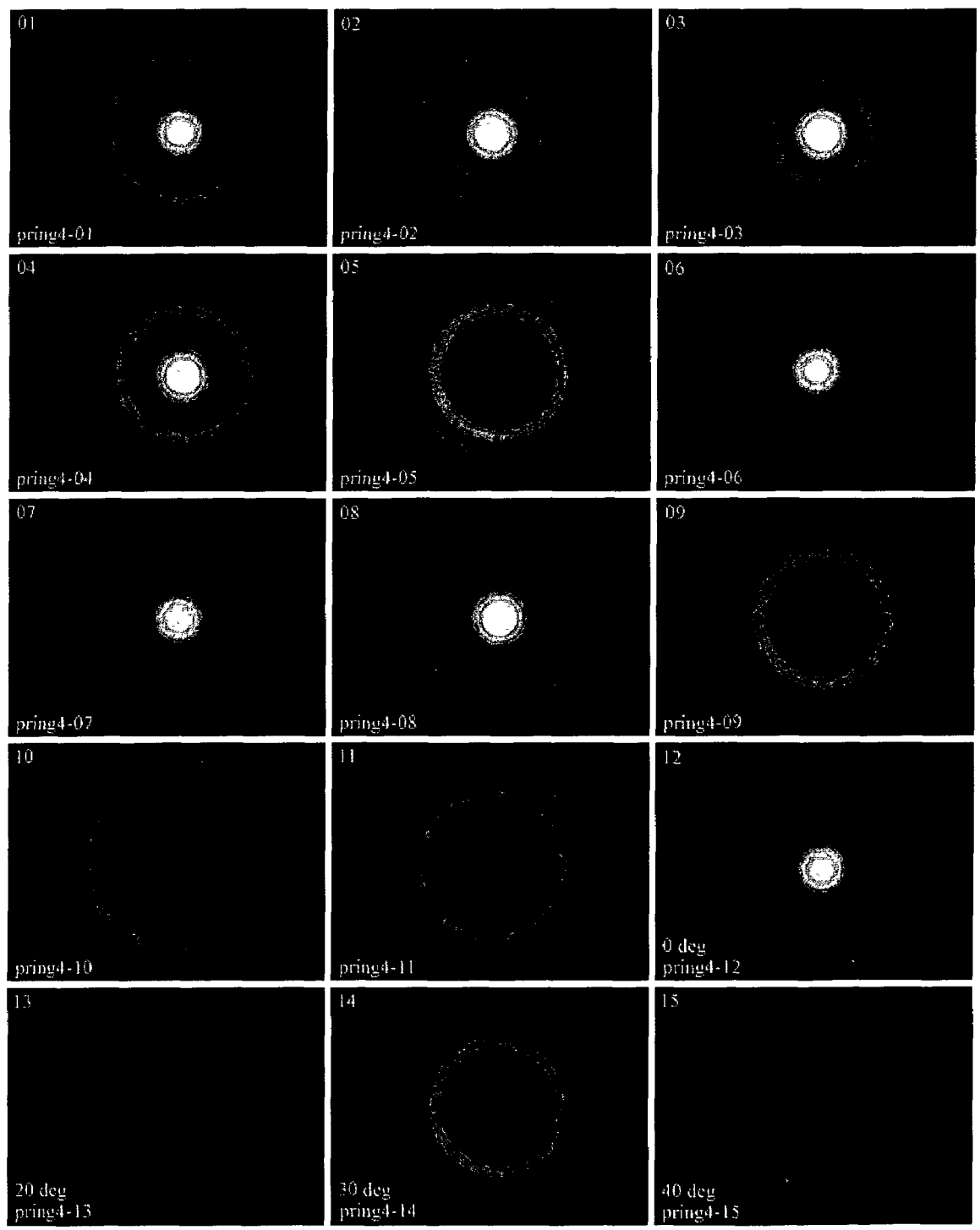
FIG. 22 shows the output radiation patterns resulting from various combinations of one to four input beams.
Figure 23:
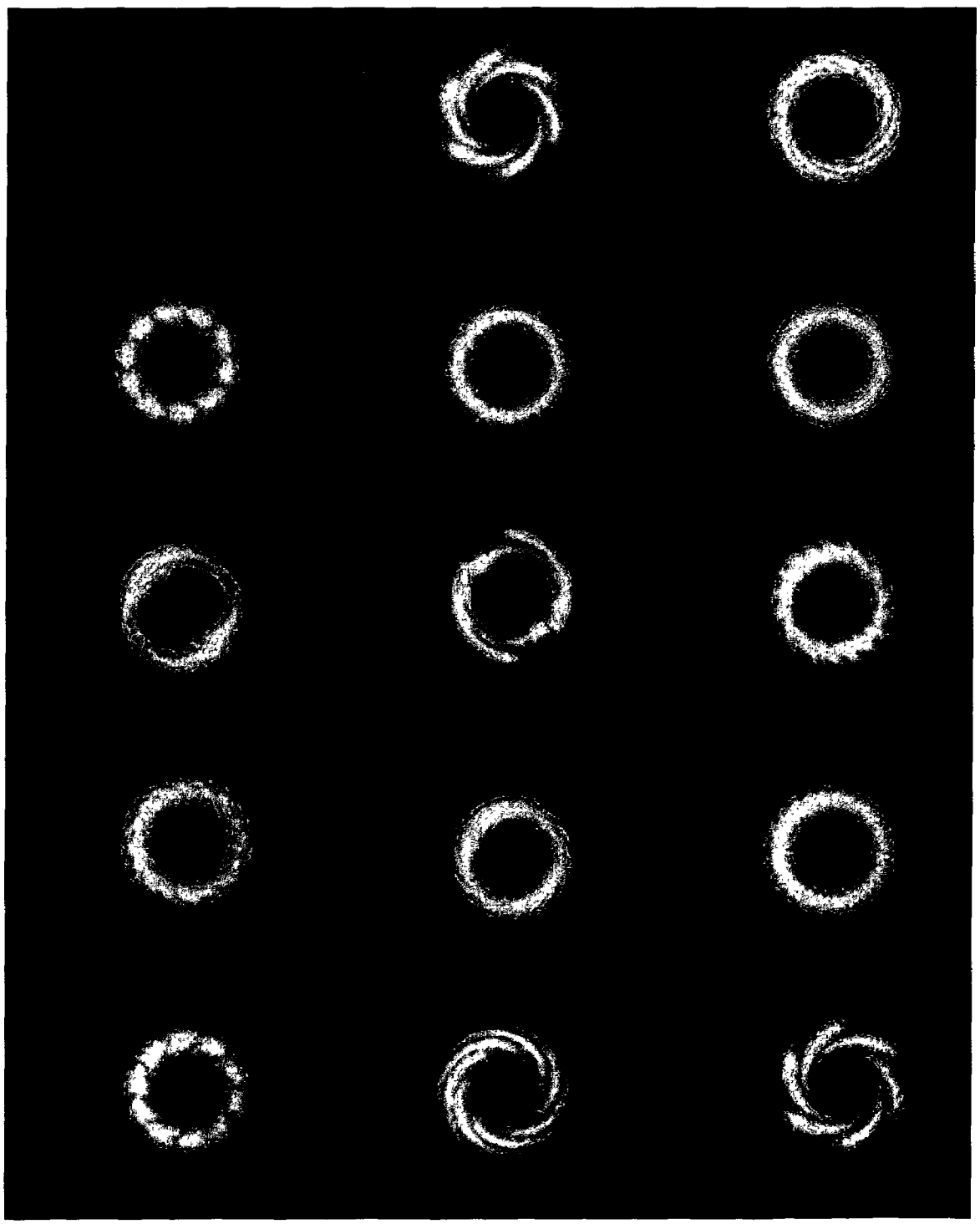
FIG. 23 shows the output radiation patterns of excitations beams exiting a 1 meter fiber, illustrating helical propagation of light.
Figure 24:
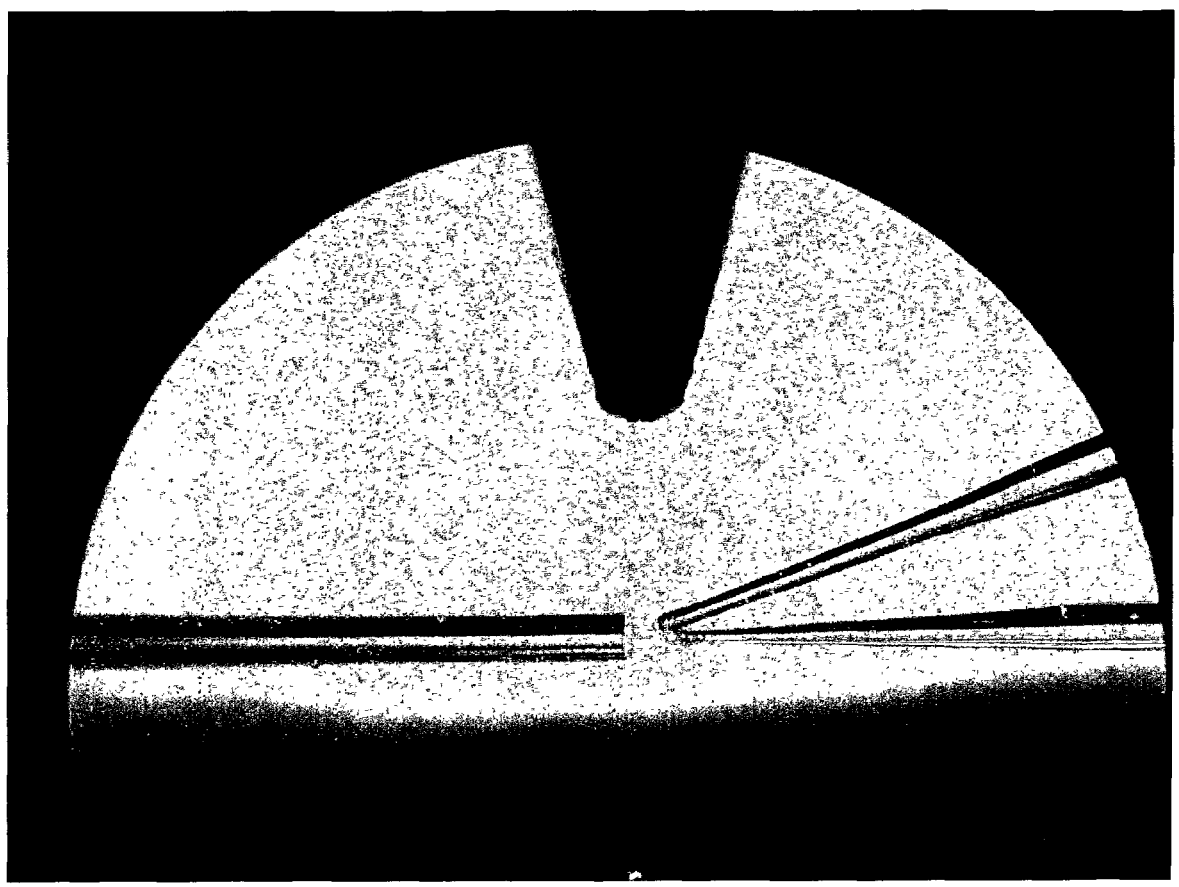
FIG. 24 is a photograph of two optical fibers having non-flat ends launching input beams into a flat end fiber.
Figure 25:
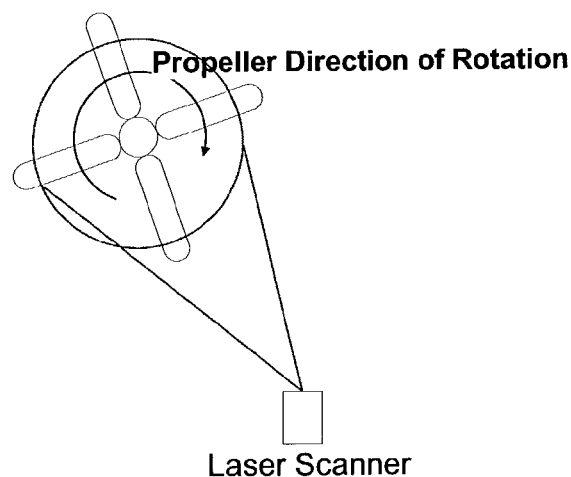
FIG. 25 shows a laser scanner positioned with respect to a propeller.

Spatial modulation results in unique spatial locations for different input excitations. This modulation can be a function of the input excitation angle and exits the fiber in one or more spatial rings. Each mode of propagation can correspond to a unique input angle and can exit the fiber (when properly prepared) at the same angle to produce a circular pattern. Each individual ring can be used to communicate information as shown in FIG. 22.

Switching information between the spatially (modal) multiplexed channels can encrypt the data and a secure fiber optic communications link can be established that can provide enhanced Data Assurance without sacrificing bandwidth.

The different modes can utilize different laser sources which all operate at the same wavelength. Normally this would result in a mixing of the date from each source into a 'jumble' of signals resembling noise and preventing the user from extracting the data. Since each signal is now assigned a particular mode of the waveguide, the signals do not mix and with the proper optical receiver can be separated into individual signals. Data can be "hopped" between different spatial modes and with the proper output optics and electronic processing separated into the individual channels and the original data stream reconstructed. The subject system can incorporate an optical 'encoding' transmitter and 'decoding' receiver.

This can be used along with standard encoding techniques to provide higher security. Data unrelated to the transmission can be transmitted on one mode as a kind of jamming signal for further security. Without the proper psuedo-random key and proper optical separation techniques, unauthorized line tapping will result in a signal buried deep in noise and unrecoverable.

In addition, unlike current data encryption and error correction techniques, the extra encryption does not consume link bandwidth since modes not normally used for transmission of data carry the overhead 'penalty.'

EXAMPLE 6

The subject invention also relates to a method and apparatus for optical switching/routing. These switches and routers can enable switching and routing of spatially modulated optical signals in accordance with the subject invention, and be incorporated into fiber optic communications systems. The light exiting a fiber can be spatially modulated as a function of input excitation as shown in the FIG. 28.

Corrective Optics can be employed to gather the optical energy from any of the circular ring patterns and focused it down to multiple fibers. An example of such optics is shown in Figure (new invention disclosure switches 1). Hence optical switching and routing can be achieved by changing the angle of incidence. The angle of incidence can be changed either by, for example an MEM type device or something similar to the acousto-optic modulator.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A method of multiplexing, comprising:
launching a first light beam into a cylindrical optical waveguide at a first input angle;
launching a second light beam into the cylindrical optical waveguide at a second input angle, wherein the second input angle is different from the first input angle,
wherein light from the first light beam exits the cylindrical optical waveguide at a first output angle and light from the second light beam exits the cylindrical optical waveguide at a second output angle, wherein the second output angle is different from the first output angle.

2. The method according to claim 1, wherein the cylindrical optical waveguide is an optical fiber.

3. The method according to claim 2, further comprising:
launching at least one additional light beam into the optical fiber at a corresponding at least one additional input angle,
wherein each of the at least one additional input angle is different from the first input angle, the second input angle, and each of the other additional input angles, wherein light from each of the at least one additional light beam exits the optical fiber at a corresponding at least one additional output angle, wherein each of the at least one additional output angle is different from the first output angle, the second output angle, and each of the other at least one additional output angle.

4. The method according to claim 2, wherein the optical fiber is a step index optical fiber.

5. The method according to claim 2, wherein the optical fiber is a graded index optical fiber.

6. The method according to claim 2, wherein the optical fiber is a single mode optical fiber.

7. The method according to claim 2, wherein the optical fiber is a multi-mode optical fiber.

8. The method according to claim 2, wherein the optical fiber comprises silica.

9. The method according to claim 2, wherein the optical fiber comprises plastic.

10. The method according to claim 2, wherein at least one of the first light beam and the second light beam comprise skew rays.

11. The method according to claim 2, wherein at least one of the first light beam and the second light beam propagates through the optical fiber in a helical path.

12. The method according to claim 2, wherein at least one of the first light beam and the second light beam exits the optical fiber and forms a helical pattern.

13. The method according to claim 2, wherein at least one of the first light beam and the second light beam exits the optical fiber and forms a circular pattern.

14. The method according to claim 2, further comprising recovering the first light beam exiting the optical fiber; and recovering the second light beam exiting the optical fiber.

15. The method according to claim 3, wherein the first light beam exits the optical fiber to form a circular pattern.

16. The method according to claim 3, wherein the first light beam exits the optical fiber to form a helical pattern.

* * * * *

UNITED STATES PATENT AND TRADEMARK OFFICE
CERTIFICATE OF CORRECTION

PATENT NO. : 7,174,067 B2 Page 1 of 2
APPLICATION NO. : 10/313235
DATED : February 6, 2007
INVENTOR(S) : Syed Murshid, Barry Grossman and Puntada Narakorn It is certified that error appears in the above-identified patent and that said Letters Patent is hereby corrected as shown below:

Column 2,
Line 16, "$\theta_l$" should read --$\theta_i$--

Column 4,
Line 62, "infonnation" should read --information--.

Column 5,
Line 38, "$n_o \sin \theta_l = n_1 \sin \theta_t$" should read -- $n_0 \sin \theta_i = n_1 \sin \theta_t$--.
Line 49, "$\theta_l$ = angle of incidence in air" should read -- $\theta_i$ = angle of incidence in air--.
Line 60, "$\sin \theta_c$" should read --$\sin \theta_c$--.

Column 8,
Line 36, "various $\theta_l$" should read --various $\theta_i$--.
Line 39, "increasing $\theta_l$" should read --increasing $\theta_i$--.
Line 49, "(a) $\theta_l = 0°$" should read -- (a) $\theta_i = 0°$--.
Line 50, "(c) $\theta_l = 20°$" should read -- (c) $\theta_i = 20°$--.
Line 51, "(d) $\theta_l = 30°$" should read —(d) $\theta_i = 30°$--.
Line 57, "(e) For $\theta_l$" should read --(e) For $\theta_i$--.
Line 60, "laser is at $\theta_l = 50°$" should read --laser is at $\theta_i = 50°$--.

Column 14,
Line 40, "incidendce ($\theta_l$)" should read --incidence ($\theta_i$)--.
Line 43, "increasing ($\theta_l$)" should read --increasing ($\theta_i$)--.
Line 53, "(a) $\theta_l = 0°$" should read -- (a) $\theta_i = 0°$--.
Line 54, "(b) $\theta_l = 10°$" should read -- (b) $\theta_i = 10°$--.
Line 54, "(c) $\theta_l = 20°$" should read -- (c) $\theta_i = 20°$--.
Line 54, "(d) $\theta_l = 30°$" should read --(d) $\theta_i = 30°$--.
Line 55, "(e) $\theta_l = 40°$" should read --(e) $\theta_i = 40°$--.

UNITED STATES PATENT AND TRADEMARK OFFICE
CERTIFICATE OF CORRECTION

PATENT NO. : 7,174,067 B2
APPLICATION NO. : 10/313235
DATED : February 6, 2007
INVENTOR(S) : Syed Murshid, Barry Grossman and Puntada Narakorn It is certified that error appears in the above-identified patent and that said Letters Patent is hereby corrected as shown below:

Column 15,
Line 7, "$\theta_l = 50°$" should read --$\theta_i = 50°$--.
Line 11, "For $\theta_l$ between" should read --For $\theta_i$ between--.
Line 15, "For $\theta_l$ is over" should read --For $\theta_i$ is over--.

Signed and Sealed this

Fourteenth Day of August, 2007

JON W. DUDAS
*Director of the United States Patent and Trademark Office*

UNITED STATES PATENT AND TRADEMARK OFFICE
CERTIFICATE OF CORRECTION

PATENT NO.       : 7,174,067 B2
APPLICATION NO.  : 10/313235
DATED            : February 6, 2007
INVENTOR(S)      : Syed Murshid, Barry Grossman and Puntada Narakorn It is certified that error appears in the above-identified patent and that said Letters Patent is hereby corrected as shown below:

Column 2,
Line 16, "$\theta_l$" should read --$\theta_i$--.

Column 4,
Line 62, "infonnation" should read --information--.

Column 5,
Line 38, "$n_0 \sin \theta_i = n_1 \sin \theta_t$" should read -- $n_0 \sin \theta_i = n_1 \sin \theta_t$--.
Line 49, "$\theta_l$ = angle of incidence in air" should read -- $\theta_i$ = angle of incidence in air--.
Line 60, "$\sin\theta_c$" should read --$\sin \theta_c$--.

Column 8,
Line 36, "various $\theta_l$" should read --various $\theta_i$--.
Line 39, "increasing $\theta_l$" should read --increasing $\theta_i$--.
Line 49, "(a) $\theta_l = 0°$" should read -- (a) $\theta_i = 0°$--.
Line 50, "(c) $\theta_l = 20°$" should read -- (c) $\theta_i = 20°$--.
Line 51, "(d) $\theta_l = 30°$" should read --(d) $\theta_i = 30°$--.
Line 57, "(e) For $\theta_l$" should read --(e) For $\theta_i$--.
Line 60, "laser is at $\theta_l = 50°$" should read --laser is at $\theta_i = 50°$--.

Column 14,
Line 40, "incidence ($\theta_l$)" should read --incidence ($\theta_i$)--.
Line 43, "increasing ($\theta_l$)" should read --increasing ($\theta_i$)--.
Line 53, "(a) $\theta_l = 0°$" should read -- (a) $\theta_i = 0°$--.
Line 54, "(b) $\theta_l = 10°$" should read -- (b) $\theta_i = 10°$--.
Line 54, "(c) $\theta_l = 20°$" should read -- (c) $\theta_i = 20°$--.
Line 54, "(d) $\theta_l = 30°$" should read -- (d) $\theta_i = 30°$--.
Line 55, "(e) $\theta_l = 40°$" should read --(e) $\theta_i = 40°$--.

UNITED STATES PATENT AND TRADEMARK OFFICE
CERTIFICATE OF CORRECTION

PATENT NO. : 7,174,067 B2
APPLICATION NO. : 10/313235
DATED : February 6, 2007
INVENTOR(S) : Syed Murshid, Barry Grossman and Puntada Narakorn It is certified that error appears in the above-identified patent and that said Letters Patent is hereby corrected as shown below:

Column 15,
Line 7, "$\theta_l = 50°$" should read --$\theta_i = 50°$--.
Line 11, "For $\theta_l$ between" should read --For $\theta_i$ between--.
Line 15, "For $\theta_l$ is over" should read --For $\theta_i$ is over--.

Signed and Sealed this

Twenty-eighth Day of August, 2007

JON W. DUDAS
*Director of the United States Patent and Trademark Office*